(12) United States Patent
Frey et al.

(10) Patent No.: US 9,367,264 B2
(45) Date of Patent: *Jun. 14, 2016

(54) TRANSACTION CHECK INSTRUCTION FOR MEMORY TRANSACTIONS

(71) Applicant: INTERNATIONAL BUSINESS MACHINES CORPORATION, Armonk, NY (US)

(72) Inventors: Bradly G. Frey, Austin, TX (US); Guy L. Guthrie, Austin, TX (US); Cathy May, Ossining, NY (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/777,511

(22) Filed: Feb. 26, 2013

(65) Prior Publication Data

US 2014/0047196 A1 Feb. 13, 2014

Related U.S. Application Data

(63) Continuation of application No. 13/657,012, filed on Oct. 22, 2012.

(60) Provisional application No. 61/681,872, filed on Aug. 10, 2012.

(51) Int. Cl.
*G06F 12/00* (2006.01)
*G06F 3/06* (2006.01)
(Continued)

(52) U.S. Cl.
CPC .............. *G06F 3/0668* (2013.01); *G06F 9/467* (2013.01); *G06F 12/0811* (2013.01)

(58) Field of Classification Search
CPC ........... G06F 9/52–9/528; G06F 12/00; G06F 3/0668; G06F 9/467; G06F 12/0811
See application file for complete search history.

(56) References Cited

U.S. PATENT DOCUMENTS 7,395,382 B1  7/2008 Moir
7,478,210 B2  1/2009 Saha et al.
(Continued)

OTHER PUBLICATIONS

U.S. Appl. No. 13/657,012 entitled "Transaction Check Instruction for Memory Transactions"; Non-final office action dated Oct. 3, 2014. (29 pg).

(Continued)

*Primary Examiner* — Kevin Verbrugge
*Assistant Examiner* — Tahilba Puche
(74) *Attorney, Agent, or Firm* — Brian F. Russell; Steven L. Bennett

(57) ABSTRACT

A processing unit of a data processing system having a shared memory system executes a memory transaction including a transactional store instruction that causes a processing unit of the data processing system to make a conditional update to a target memory block of the shared memory system conditioned on successful commitment of the memory transaction. The memory transaction further includes a transaction check instruction. In response to executing the transaction check instruction, the processing unit determines, prior to conclusion of the memory transaction, whether the target memory block of the shared memory system was modified after the conditional update caused by execution of the transactional store instruction. In response to determining that the target memory block has been modified, a condition register within the processing unit is set to indicate a conflict for the memory transaction.

6 Claims, 19 Drawing Sheets

(51) Int. Cl.
    *G06F 9/46*     (2006.01)
    *G06F 12/08*    (2016.01)

(56)           References Cited

U.S. PATENT DOCUMENTS

| | | | |
|---|---|---|---|
| 7,644,238 B2 | 1/2010 | Carrie | |
| 7,840,530 B2 | 11/2010 | MacGruder et al. | |
| 2002/0161815 A1 | 10/2002 | Bischof et al. | |
| 2005/0055516 A1* | 3/2005 | Menon | G06F 8/4442 711/158 |
| 2007/0239942 A1* | 10/2007 | Rajwar et al. | 711/147 |
| 2007/0288708 A1 | 12/2007 | Saha et al. | |
| 2008/0040551 A1* | 2/2008 | Gray et al. | 711/130 |
| 2009/0031310 A1 | 1/2009 | Lev et al. | |
| 2009/0172317 A1* | 7/2009 | Saha | G06F 9/3004 711/159 |
| 2010/0023703 A1 | 1/2010 | Christie et al. | |
| 2010/0174874 A1 | 7/2010 | Blainey et al. | |
| 2010/0205408 A1* | 8/2010 | Chung et al. | 712/216 |
| 2010/0332538 A1 | 12/2010 | Gray et al. | |
| 2011/0087867 A1 | 4/2011 | Jacobson et al. | |
| 2011/0145637 A1 | 6/2011 | Gray et al. | |
| 2011/0167222 A1* | 7/2011 | Lee et al. | 711/118 |
| 2011/0314244 A1 | 12/2011 | Sodhi et al. | |
| 2012/0079215 A1 | 3/2012 | Gray et al. | |
| 2012/0084536 A1* | 4/2012 | Jacobson et al. | 712/208 |
| 2012/0166747 A1 | 6/2012 | Blainey et al. | |
| 2013/0205119 A1 | 8/2013 | Rajwar et al. | |

OTHER PUBLICATIONS

U.S. Appl. No. 13/657,012 entitled "Transaction Check Instruction for Memory Transactions"; Final office action dated Mar. 25, 2015. (24 pg).

* cited by examiner

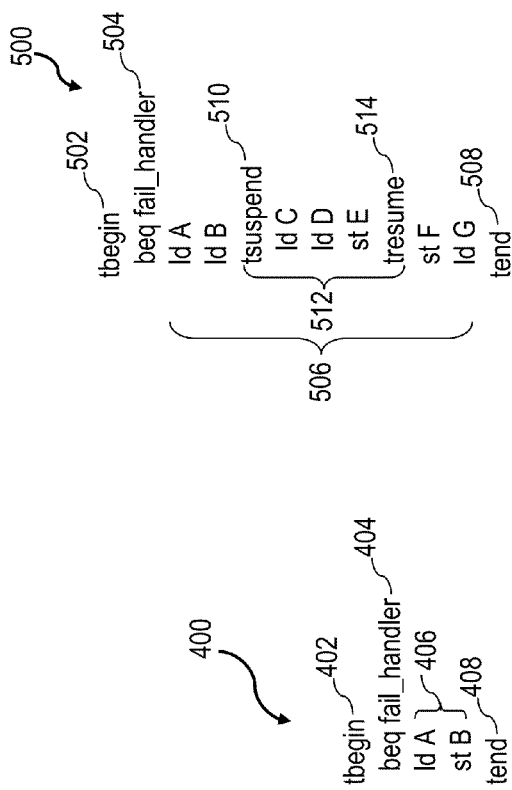
Figure 4
Figure 5
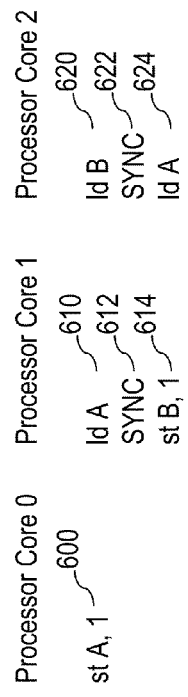
Figure 6A

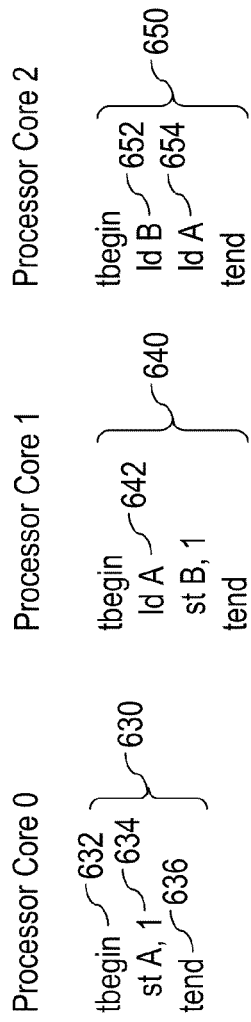
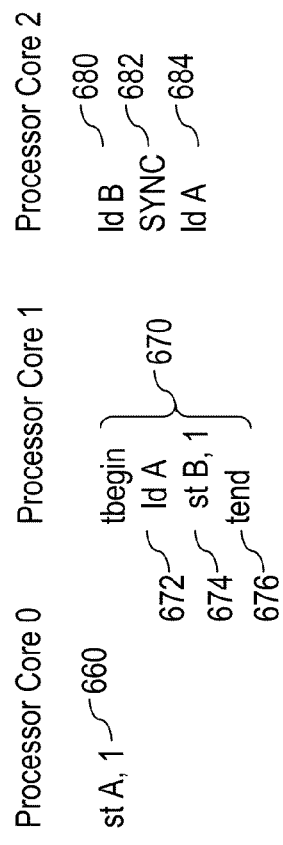
*Figure 6B*
*Figure 6C*

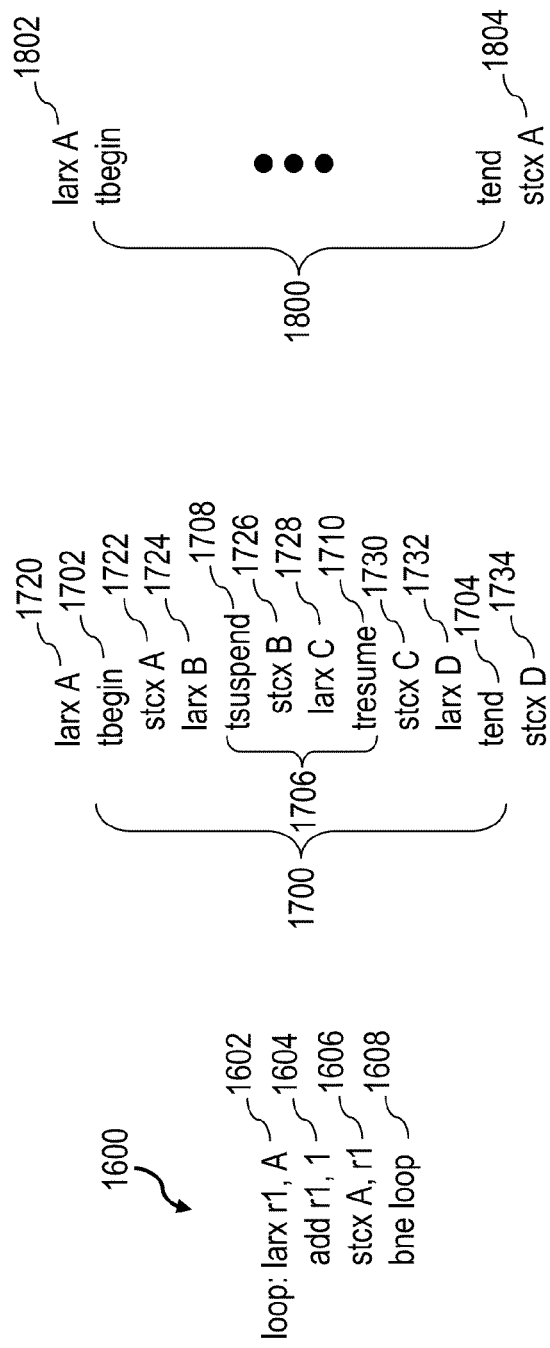

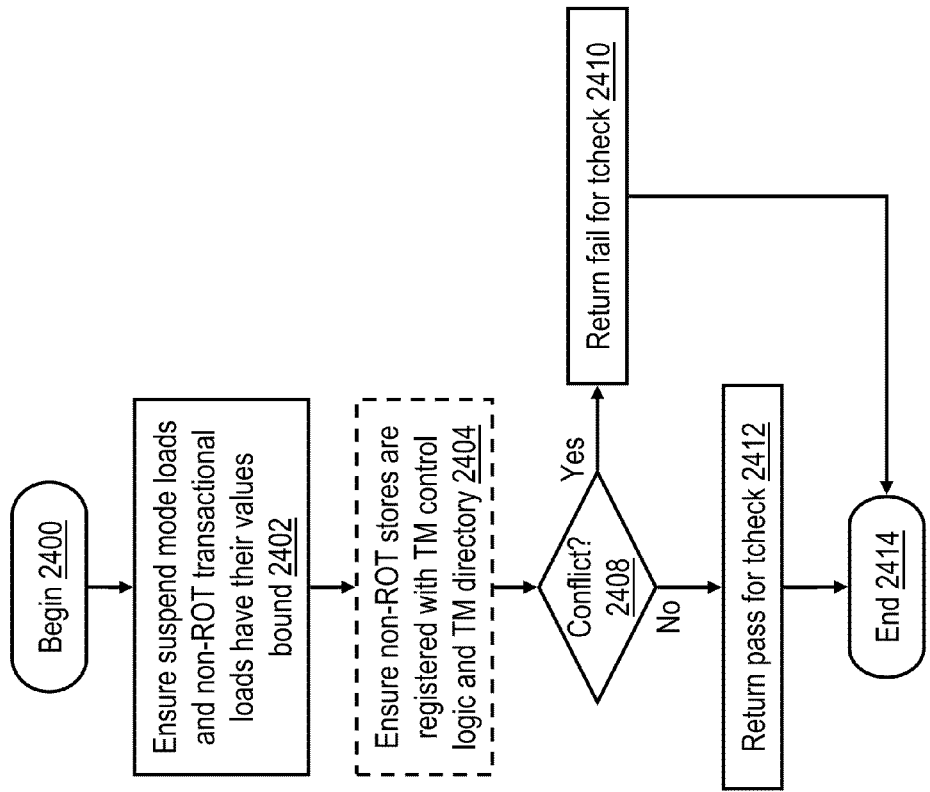

TRANSACTION CHECK INSTRUCTION FOR MEMORY TRANSACTIONS

PRIORITY CLAIM

This application is a continuation of U.S. patent application Ser. No. 13/657,012 entitled "TRANSACTION CHECK INSTRUCTION FOR MEMORY TRANSACTIONS," filed on Oct. 22, 2012, the disclosure of which is incorporated herein by reference in its entirety for all purposes.

BACKGROUND OF THE INVENTION

The present invention relates generally to data processing and, in particular, to storage accesses to the distributed shared memory system of a data processing system.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then accesses lower-level caches (e.g., level two (L2) or level three (L3) caches) or system memory for the requested memory block. The lowest level cache (e.g., L3 cache) is often shared among several processor cores.

In such systems, multiprocessor software concurrently accesses shared data structures from multiple software threads. When concurrently accessing shared data it is typically necessary to prevent so-called "unconstrained races" or "conflicts". A conflict occurs between two memory accesses when they are to the same memory location and at least one of them is a write and there is no means to ensure the ordering in which those accesses occur.

Multiprocessor software typically utilizes lock variables to coordinate the concurrent reading and modifying of locations in memory in an orderly conflict-free fashion. A lock variable is a location in memory that is read and then set to a certain value, possibly based on the value read, in an atomic fashion. The read-modify-write operation on a lock variable is often accomplished utilizing an atomic-read-modify-write (ARMW) instruction or by a sequence of instructions that provide the same effect as a single instruction that atomically reads and modifies the lock variable.

In this manner, a software thread reading an initial "unlocked" value via an ARMW instruction is said to have "acquired" the lock and will, until it releases the lock, be the only software thread that holds the lock. The thread holding the lock may safely update the shared memory locations protected by the lock without conflict with other threads because the other threads cannot obtain the lock until the current thread releases the lock. When the shared locations have been read and/or modified appropriately, the thread holding the lock releases the lock (e.g., by writing the lock variable to the "unlocked" value) to allow other threads to access the shared locations in storage.

While locking coordinates competing threads' accesses to shared data, locking suffers from a number of well known shortcomings. These include, among others, (1) the possibility of deadlock when a given thread holds more than one lock and prevents the forward progress of other threads and (2) the performance cost of lock acquisition when the lock may not have been strictly necessary because no conflicting accesses would have occurred to the shared data.

To overcome these limitations, the notion of transactional memory can be employed. In transactional memory, a set of load and/or store instructions are treated as a "transaction." A transaction succeeds when the constituent load and store operations can occur atomically without a conflict with another thread. The transaction fails in the presence of a conflict with another thread and can then be re-attempted. If a transaction continues to fail, software may fall back to using locking to ensure the orderly access of shared data.

To support transactional memory, the underlying hardware tracks the storage locations involved in the transaction—the transaction footprint—as the transaction executes for conflicts. If a conflict occurs in the transaction footprint, the transaction is aborted and possibly restarted. Use of transactional memory reduces the possibility of deadlock due to a thread holding multiple locks because, in the typical case, no locks are held (the transaction simply attempts to make one or more storage accesses and restarts if a conflict occurs). Further, the processing overhead of acquiring a lock is generally avoided.

BRIEF SUMMARY

A processing unit of a data processing system having a shared memory system executes a memory transaction including a transactional store instruction that causes a processing unit of the data processing system to make a conditional update to a target memory block of the shared memory system conditioned on successful commitment of the memory transaction. The memory transaction further includes a transaction check instruction. In response to executing the transaction check instruction, the processing unit determines, prior to conclusion of the memory transaction, whether the target memory block of the shared memory system was modified after the conditional update caused by execution of the transactional store instruction. In response to determining that the target memory block has been modified, a condition register within the processing unit is set to indicate a conflict for the memory transaction.

BRIEF DESCRIPTION OF THE SEVERAL VIEWS OF THE DRAWINGS

FIG. 4 is an illustrative example of a memory transaction in accordance with one embodiment;

FIG. 5 is an illustrative example of a memory transaction including a suspended region in accordance with one embodiment;

FIG. 6A depicts execution of an exemplary program illustrating causality in a multiprocessor data processing system;

FIG. 6B illustrates execution of an exemplary program including memory transactions to ensure causality;

FIG. 6C depicts execution of an exemplary program including both transactional and non-transactional memory accesses;

FIG. 16 is a illustrative example of an instruction sequence including load-and-reserve (larx) and store-conditional (stcx) instructions;

FIG. 17 is an illustrative example of several interactions between larx/stcx instructions and a representative memory transaction in which the conditional memory update indicated by the stcx instruction will fail;

FIG. 18 is an additional example of a larx/stcx instruction pair encompassing a memory transaction;

FIG. 23 is a representative example of a memory transaction including a tcheck instruction;

FIG. 24 is a high level logical flowchart of two embodiments of an exemplary method of processing tcheck instructions;

DETAILED DESCRIPTION

Figure 1:
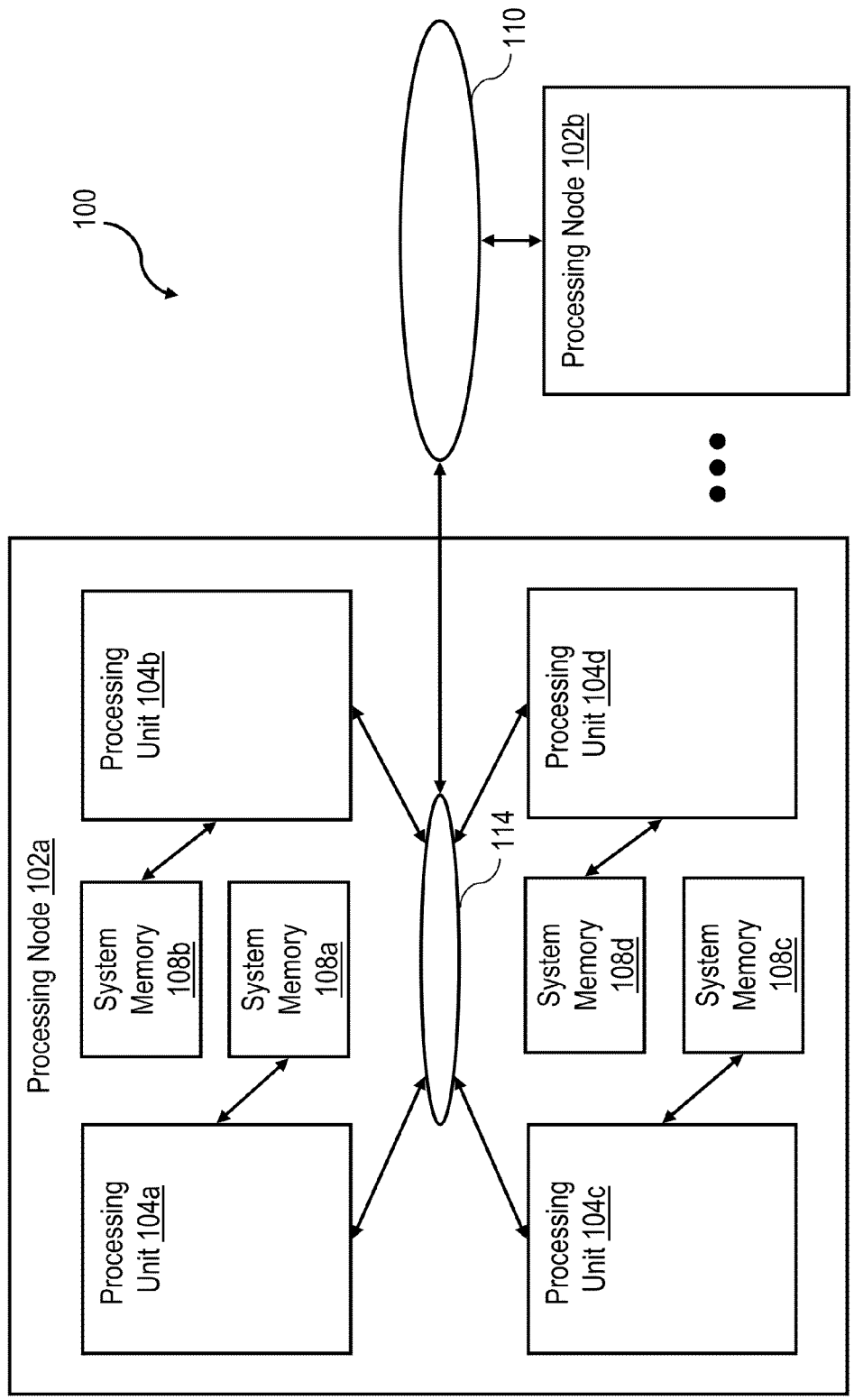
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of volatile storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing system such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access operations and atomicity of store operations.

The ordering of memory operations specifies how memory operations may, if at all, be re-ordered relative to the order of their respective load and store instructions in the individual threads of execution in the multiprocessor program. Memory consistency models must define ordering of memory access operations in four general cases: (1) ordering of the memory operations for a load instruction to a following load instruction, (2) ordering of the memory operations for a load instruction to a following store instruction, (3) ordering of the memory operations for a store instruction to a following store instruction, and (4) ordering of the memory operations for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store operations refers to whether or not a given thread of execution can read the value of its own store operation before other threads, and furthermore, whether the value written to the distributed shared memory system by the store operation becomes visible to other threads in a logically instantaneous fashion or whether the value can become visible to other threads at different points in time. A memory consistency model is called "multi-copy atomic" if the value written by a store operation of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access operations are respected. Therefore, in a data processing system 100 having a distributed shared memory system that implements a weak consistency memory model, so called "barrier" (e.g., SYNC) instructions are typically provided to allow the programmer to specify what memory access operation orderings and atomicity are to be applied during execution of the multiprocessor program.

Figure 2:
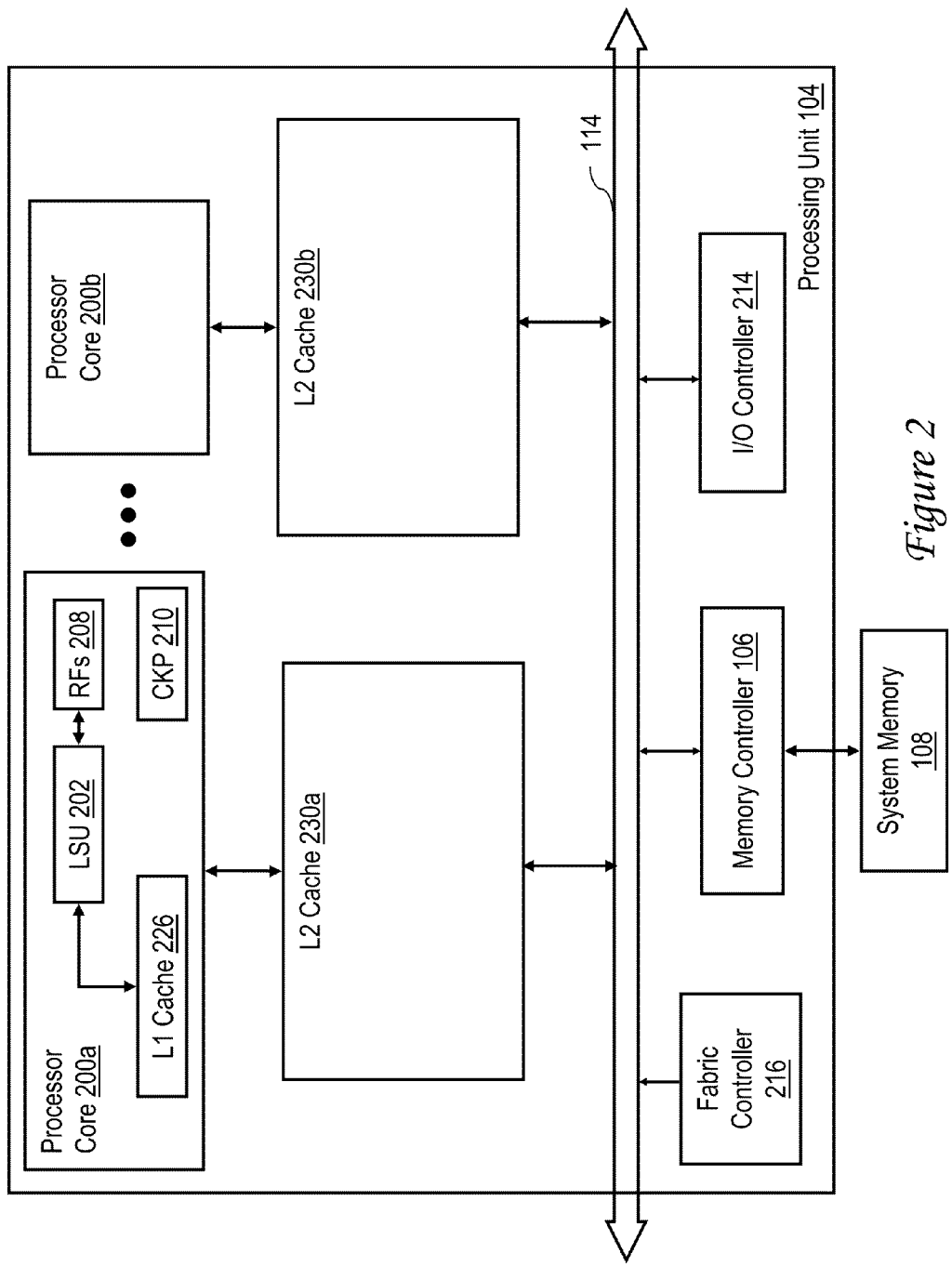
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In a preferred embodiment, each processor core 200 is capable of independently executing multiple hardware threads of execution simultaneously. However, in the following description, unless the interaction between threads executing on a same processor core is relevant in a particular context, for simplicity, terms "processor core" and "thread executing on a processor core" are used interchangeably. As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208.

The operation of each processor core 200 is supported by a multi-level volatile memory hierarchy having at its lowest level a shared system memory 108 accessed via an integrated memory controller 106, and at its upper levels, one or more levels of cache memory, which in the illustrative embodiment include a store-through level one (L1) cache 226 within and private to each processor core 200, and a respective store-in level two (L2) cache 230 for each processor core 200a, 200b. In order to efficiently handle multiple concurrent memory access requests to cacheable addresses, each L2 cache 230 can be implemented with multiple L2 cache slices, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access instruction requesting a specified memory access operation to be performed, LSU 202 executes the memory access instruction to determine the target address (e.g., an effective address) of the memory access request. After translation of the target address to a real address, L1 cache 226 is accessed utilizing the target address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 230 for servicing.

Figure 3:
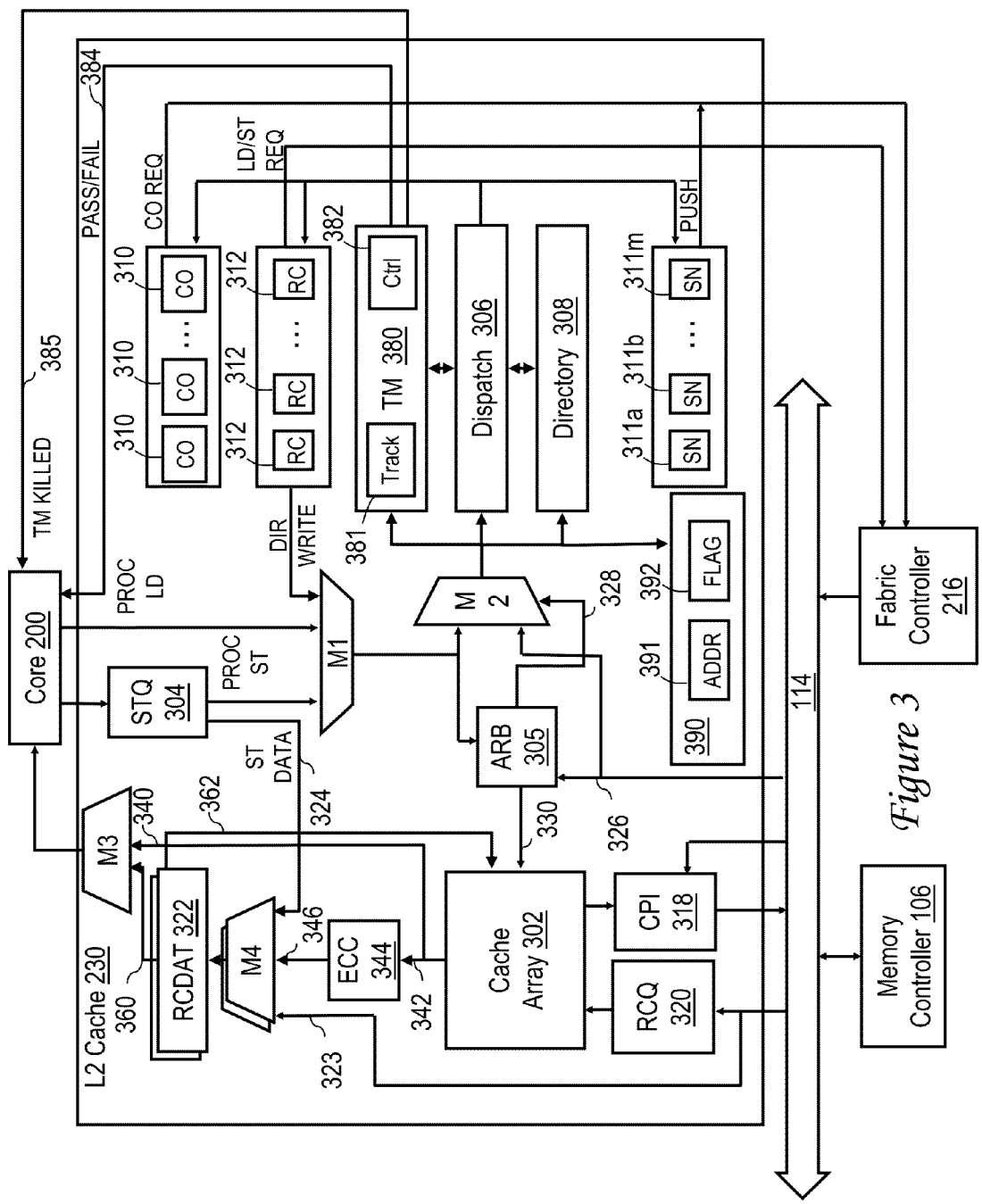
FIG. 3 is a detailed block diagram of lower level cache supporting memory transactions in accordance with one embodiment.

With reference now to FIG. 3, there is illustrated a more detailed block diagram of an exemplary embodiment of a lower level cache (e.g., an L2 cache 230) that supports memory transactions in accordance with one embodiment. As shown in FIG. 3, L2 cache 230 includes a cache array 302 and a directory 308 of the contents of cache array 302. Although not explicitly illustrated, cache array 302 preferably is implemented with a single read port and single write port to reduce the die area required to implement cache array 302.

Assuming cache array 302 and directory 308 are set associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicate the coherency state of the cache line, an LRU (Least Recently Used) field indicating a replacement order for the cache line with respect to other cache lines in the same congruence class, and inclusivity bits indicating whether the memory block is held in the associated L1 cache 226.

L2 cache 230 includes multiple (e.g., 16) Read-Claim (RC) machines 312 for independently and concurrently servicing load (LD) and store (ST) requests received from the affiliated processor core 200. In order to service remote memory access requests originating from processor cores 200 other than the affiliated processor core 200, L2 cache 230 also includes multiple snoop machines 311. Each snoop machine 311 can independently and concurrently handle a remote memory access request "snooped" from local interconnect 114. As will be appreciated, the servicing of memory access requests by RC machines 312 may require the replacement or invalidation of memory blocks within cache array 302. Accordingly, L2 cache 230 also includes CO (castout) machines 310 that manage the removal and writeback of memory blocks from cache array 302.

L2 cache 230 further includes an arbiter 305 that controls multiplexers M1-M2 to order the processing of local memory access requests and memory transaction requests (corresponding to the tbegin, tbegin_rot, tend, tabort, and tcheck instructions described further herein) received from the affiliated processor core 200 and remote requests snooped on local interconnect 114. Such requests, including local load and store and memory transaction requests and remote load and store requests, are forwarded in accordance with the arbitration policy implemented by arbiter 305 to dispatch logic, such as a dispatch pipeline 306, which processes each read/load and store request with respect to directory 308 and cache array 302. As described further below, transactional memory (TM) logic 380 processes memory transaction requests and tracks memory access operations within memory transactions to ensure completion of the memory access operations in an atomic manner or to abort the memory transactions in the presence of conflicts.

L2 cache 230 also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that each CO machine 310 and each snooper 311 that is dispatched retrieves data from only the respective designated CPI buffer entry.

Each RC machine 312 also has assigned to it a respective one of multiple RC data (RCDAT) buffers 322 for buffering a memory block read from cache array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, a processor core 200 transmits store requests comprising a transaction type (ttype), target real address and store data to a store queue (STQ) 304. From STQ 304, the store data are transmitted to store data multiplexer M4 via data path 324, and the transaction type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

The request selected for processing by arbiter 305 is placed by multiplexer M2 into dispatch pipeline 306. Dispatch pipeline 306 preferably is implemented as a fixed duration pipeline in which each of multiple possible overlapping requests is processed for a predetermined number of clock cycles (e.g., 4 cycles). During the first cycle of processing within dispatch pipeline 306, a directory read is performed utilizing the request address to determine if the request address hits or misses in directory 308, and if the memory address hits, the coherency state of the target memory block. The directory information, which includes a hit/miss indication and the coherency state of the memory block, is returned by directory 308 to dispatch pipeline 306 in a subsequent cycle. As will be appreciated, no action is generally taken within an L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 104, may entail communication on local interconnect 114 via fabric controller 216.

At a predetermined time during processing of the memory access request within dispatch pipeline 306, arbiter 305 transmits the request address to cache array 302 via address and control path 330 to initiate a cache read of the memory block specified by the request address. The memory block read from cache array 302 is transmitted via data path 342 to Error Correcting Code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 makes a dispatch determination based upon a number of criteria, including (1) the presence of an address collision between the request address and a previous request address currently being processed by a castout machine 310, snoop machine 311 or RC machine 312, (2) the directory information, and (3) availability of an RC machine 312 or snoop machine 311 to process the memory access request. If dispatch pipeline 306 makes a dispatch determination that the memory access request is to be dispatched, the memory access request is dispatched from dispatch pipeline 306 to an RC machine 312 or a snoop machine 311. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of directory 308, if necessary. In addition, the RC machine 312 may perform a cache write to update the relevant cache line of cache array 302. Directory writes 408a, 408b and cache writes may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state.

Associated with RC machines 312 is data handling circuitry, different portions of which are employed during the servicing of various types of local memory access requests. For example, for a local load request that hits in directory 308, an uncorrected copy of the target memory block is forwarded from cache array 302 to the affiliated processor core 200 via data path 340 and load data multiplexer M3 and additionally forwarded to ECC logic 344 via data path 342. In the case of an ECC error in the target memory block obtained by the local load request, corrected data is forwarded to RCDAT buffer 322 via data path 346 and store data multiplexer M4 and then from RCDAT 322 to affiliated processor core 200 via data path 360 and load data multiplexer M3. For a local store request, store data is received within RCDAT buffer 322 from STQ 304 via data path 324 and store data multiplexer M4, the store is merged with the memory block read into RCDAT buffer 322 from cache array 302 via ECC logic 344 and store data multiplexer M4, and the merged store data is then written from RCDAT buffer 322 into cache array 302 via data path 362. In response to a local load miss or local store miss, the target memory block acquired through issuing a memory access operation on local interconnect 114 is loaded into cache array 302 via reload bus 323, store data multiplexer M4, RCDAT buffer 322 (with store merge for a store miss) and data path 362.

Referring now to FIG. 4, an illustrative example of a memory transaction is depicted. Those skilled in the art will recognize that the particular semantics and instructions utilized to implement the various memory transactions described herein are but some of the numerous possible implementations and that the disclosed techniques of implementing transactional memory are not dependent on the specific instructions and instruction semantics employed.

Illustrative memory transaction 400 begins at tbegin instruction 402. Tbegin instruction 402 initiates memory transaction 400, causes the processor core 200 executing tbegin instruction 402 to take a checkpoint 210 of the architected register state of processor core 200, and (e.g., through a corresponding tbegin request sent to the affiliated L2 cache 230) invokes tracking of load and store instructions within the transaction body 406 to ensure they complete in an atomic fashion or that memory transaction 400 fails in the presence of a conflict. Memory transaction 400 additionally includes a branch instruction 404 immediately following tbegin instruction 402. When memory transaction 400 first executes, the condition code register in processor core 200 upon which branch instruction 404 depends is initialized to a value that causes the program branch indicated by branch instruction 404 not to be taken and the flow of execution to continue to transaction body 406. As discussed below, in response to failure of memory transaction 400, the condition code register is set to a different value, and branch instruction 404 causes execution to branch to a fail handler routine.

In the exemplary embodiment depicted in FIG. 3, TM logic 380 tracks transactional memory access (e.g., load and store) instructions within transaction body 406 to ensure that they complete in an atomic fashion or that memory transaction 400 fails in the presence of a conflict. In particular, TM tracking logic 381 within TM logic 380 includes a number of entries that indicate which cache lines in cache array 302 are included in the transaction footprint (as described below, for example, with reference to FIG. 10). The transaction footprint includes two portions: the load footprint corresponding to cache lines touched solely by loads within transaction body 406 (e.g., the cache line at address A in exemplary memory transaction 400) and the store footprint corresponding to cache lines touched solely by store instructions or by both load and store instructions in transaction body 406 (e.g., the cache line at address B in exemplary memory transaction 400).

As further shown in FIG. 3, TM logic 380 further includes transactional control logic 382, which controls the sequencing of a memory transaction and provides a pass/fail indication 384 and an optional TM killed indication 385 to the associated processor core 200. Pass/fail indication 384 indicates to processor core 200 whether or not the memory transaction successfully committed to the distributed shared memory system at the execution of the tend instruction 408 at the end of memory transaction 400. TM killed indication 385 indicates to processor core 200 whether or not a conflict has occurred during the transaction. In response to transactional control logic 382 asserting TM killed indication 385, processor core 200 may, as a performance optimization, optionally abort and restart memory transaction 400 prior to reaching tend instruction 408.

In response to pass/fail indication 384 (or optionally TM killed indication 385) indicating that a conflict has occurred during execution of memory transaction 400, processor core 200 re-establishes its architected register state from the checkpoint 210 taken at the execution of tbegin instruction 402, invalidates the tentatively modified cache lines in the store footprint, releases tracking logic 381, sets the condition code register such that branch instruction 404 will be taken, and transfers control to branch instruction 404. In addition, processor core 200 sets a transaction failure cause register (not shown) in processor core 200 to indicate the cause of the memory transaction's failure. The fail handler routine invoked by branch instruction 404 may choose to re-attempt memory transaction 400 or fall back to more conventional locking mechanisms, optionally based on the content of the transaction failure cause register.

During the execution of a memory transaction, the values stored to the distributed shared memory system by transaction body 406 (i.e., those in the store footprint of the memory transaction) are visible only to the thread of the processor core 200 executing the memory transaction. Threads running on the same or other processor cores 200 will not see these values until and only if the memory transaction successfully commits.

For a memory transaction to successfully commit, the load and store instructions in transaction body 406 must complete in an atomic fashion (i.e., there must be no conflicts for the cache lines in the memory transaction's load and store footprints) and the effects of the store instructions in transaction body 406 must propagate to all processing units 104 in data processing system 100 and invalidate any cached copies of those cache lines held in other processing units 104. If both of these conditions hold when tend instruction 408 is executed, transactional control logic 382 indicates to processor core 200 via pass/fail indication 384 that memory transaction 400 passed and commits all stores performed in transaction body 406 to L2 cache 230, thus making them visible to all other threads and processor cores 200 in the system simultaneously.

In the following discussion, a load or store instruction will be called "transactional" if that load or store instruction occurs within the transaction body 406 of a memory transaction 400. Similarly, a load or store will be called "non-transactional" if it occurs outside a transaction body 406. In one exemplary embodiment, a conflict policy of data processing system 100 defines a conflict with another processor core's memory access to occur for a given memory transaction in any one of several possible cases. In a first case, a conflict occurs if a non-transactional store from another processor core 200 hits a cache line within either the given memory transaction's load or store footprint. In a second case, a conflict occurs if a transactional store from another processor core 200 hits a cache line within the given memory transaction's load footprint. In a third case, a conflict occurs if a non-transactional load hits a cache line within the given memory transaction's store footprint. In a fourth case, a conflict occurs if a transactional load from another processor core 200 hits a cache line within the given memory transaction's store footprint. In addition, the given memory transaction has a conflict if one of its transactional stores hits an address already extant in the store footprint of another processor core's memory transaction. This exemplary conflict policy is but one of several possible embodiments of transactional memory. The above conflict policy biases in favor of transactional stores over transactional loads, while allowing transactional and non-transactional loads to freely intermingle.

With reference now to FIG. 5, there is illustrated a representative memory transaction 500 containing a suspended region. As can be seen by comparison of FIGS. 4-5, memory transaction 500 includes a tbegin instruction 502, branch instruction 504, transaction body 506 and tend instruction 508, which correspond to tbegin instruction 402, branch instruction 404, transaction body 406 and tend instruction 408 described above. In addition, memory transaction 500 includes a tsuspend instruction 510 that initiates the start of a suspended region 512. When a memory transaction is suspended through execution of tsuspend instruction 510, the load and store footprints currently established for the enclosing memory transaction containing suspended region 512 remain in place and continue to be tracked by TM tracking logic 381 for conflicts. However, any load or store instructions within suspended region 512 are treated as non-transactional loads and stores and follow existing semantics for such loads and stores. In particular, stores within suspended region 512 are non-transactional and will commit and begin propagating to other processors unconditionally. If a store within suspended region 512 hits either the load or the store footprint of the enclosing memory transaction, a conflict occurs (which also destroys the tentative transactional version of the cache line in the store footprint) and is logged by transactional control logic 382. However, this conflict is not acted on until the enclosing memory transaction is resumed upon execution of tresume instruction 514, at which point the processor core 200 passes control to branch instruction 504 as described. If a non-transactional load instruction within suspended region 512 hits a cache line within the store footprint of the enclosing memory transaction 500, that load instruction returns the tentatively updated value written by a transactional store within the transaction body 506 unless that value has been overwritten by a non-transactional store either by another processor core 200 or by a non-transactional store in suspended region 512, in which case the non-transactional load instruction returns the current value of the target location.

Use of a suspended region 512 allows the temporary suspension of a memory transaction, which permits store instructions in the suspended region 512 to unconditionally update locations in the distributed shared memory system while also allowing for the resumption of the memory transaction at a later time. One possible use for a suspended region 512 is to log debug information into a scratchpad region of the distributed shared memory system and then to resume the enclosing memory transaction. Without a suspended region, the write of the debug information would be rolled back any time the enclosing memory transaction is aborted.

Referring now to FIG. 6A, the execution of an exemplary program illustrating the property of causality in a multiprocessor data processing system is shown. As used herein "causality," which is desirable property in multiprocessor programs, is defined as being preserved if, during execution of a multiprocessor program, a given thread of execution cannot read the effects of a computation before the writes that caused the computation can be read by the given thread.

In the simplified example given in FIG. 6A (as well as those discussed below with reference to FIGS. 6B-6C), a multiprocessor program is executed by three processor cores 200 of data processing system 100, labeled for ease of reference as processor core 0, processor core 1 and processor core 2. In FIG. 6A, processor core 0 executes a store instruction 600 that writes a value of 1 to address A in the distributed shared memory system. This update of address A propagates to processor core 1, and load instruction 610 executed by processor core 1 therefore returns a value of 1. Even though the memory update made by store instruction 600 has propagated to processor core 1, that memory update may not yet have propagated to processor core 2. If store instruction 614 executes on processor 1 and the associated memory update propagates to processor 2 before the memory update of store instruction 600 propagates to processor 2, causality would be violated because the store of the value of 1 to address B, which is an effect of the store to address A, would be visible to processor core 2 before the memory update associated with causal store instruction 600 was visible to processor core 2.

To ensure causality in a weak consistency memory model, barrier instruction 612 (e.g., a SYNC) ensures that store instruction 614 does not take effect or begin propagating its memory update to other processor cores until load instruction 610 has bound to its value. In addition, barrier instruction 612 also ensures that the memory update associated with store instruction 600 propagates to processor 2 before the memory update associated with store instruction 614. Thus, causality is preserved because the cause of the computation (i.e., the memory update of store instruction 600) is visible to processor core 2 before the result of the computation (i.e., the memory update of store 614). A barrier instruction 622 is also executed by processor core 2 to ensure that processor core 2 executes load instructions 620 and 624 and binds their values in order, thus guaranteeing that processor core 2 properly observes the memory updates made by processor core 0 and processor core 1.

With reference now to FIG. 6B, an exemplary embodiment of the multiprocessor program of FIG. 6A rendered in terms of memory transactions is illustrated. In FIG. 6B, the branch instructions to the memory transaction fail handler are omitted for clarity.

As illustrated, processor core 0 executes a memory transaction 630 including a tbegin instruction 632, tend instruction 636, and a transaction body including a store instruction 634 that stores a value of 1 to address A. Upon the execution of tend instruction 636, memory transaction 600 successfully commits and makes the update to address A visible to all the other processor cores simultaneously. In particular, by the time load instruction 642 of the memory transaction 640 executing on processor core 1 can read the value of 1 from address A, load instruction 654 of the memory transaction 650 executing on processor core 2 must also be able to read the value of 1 for address A. Memory transaction 640 then reads the value of 1 for address A, stores a value of 1 to address B and successfully commits. Finally, load instruction 652 of memory transaction 650 reads a value of 1 for address B, and given that memory transaction 640 read a value of 1 for A, load instruction 654 must also read a value of 1 for address A.

In order to make the memory updates of store instructions in a successful transaction visible to all other processor cores simultaneously, before that memory transaction can commit all the cache line invalidates necessitated by the memory transaction must have propagated through the data processing system such that any other processor cores' now stale copies of the updated cache lines have been removed (e.g., invalidated) and can no longer be read by the other processor cores. Without this requirement, a processor core could still read a stale value for an updated memory location after the memory transaction that updated the memory location committed. A processor core, therefore, needs to ensure that the memory updates associated with its own transactional stores are fully propagated through the data processing system to invalidate any stale cached copies before committing a successful memory transaction in order to maintain the semantics of memory transactions. As a consequence of the propagation of the memory updates inherent in the semantics of memory transactions, causality is trivially preserved when only memory transactions are utilized to access memory locations in a distributed shared memory system. However, when transactional and non-transactional code interact on the same shared variables, causality is not directly preserved by ensuring that the memory updates made by a memory transaction are visible simultaneously to all other processor cores.

Referring now to FIG. 6C, an illustrative multiprocessor program is depicted that includes a mixture of transactional and non-transactional accesses to a distributed shared memory system. In the exemplary multiprocessor program, processor core 0 executes a non-transactional store instruction 660 that unconditionally writes a value of 1 to address A in the distributed shared memory system. This value propagates to processor core 1 and is read by transactional load instruction 672 within the memory transaction 670 executed by processor core 1. Processor core 1 then executes a store instruction 674 within memory transaction 670 that updates the cache line associated with address B and completes invalidating any stale cached copies of the cache line associated with address B (so that no other processor core holds a copy of the now stale cache line) and successfully commits memory transaction 670 upon execution of tend instruction 676. Processor core 2 then executes load instructions 680 and 684 to read, in order, the cache lines associated with addresses B and A, respectively, based on the ordering enforced by barrier instruction 682. If transaction 670 only ensures that its own memory updates are fully propagated through the distributed shared memory system before committing, the memory update of store instruction 660 may or may not have propagated to processor core 2. Therefore, in at least some operating scenarios, processor core 2 could read a value of 1 for the cache line associated with address B and the, now stale, initial value of 0 for the cache line associated with address A, thus violating causality. The same result would be obtained if processor core 2 utilized transactional loads to read from addresses A and B, as depicted for processor 2 in FIG. 6B.

To guarantee causality, memory transaction 670 must ensure not only that its own transactional stores are propagated throughout the entire distributed shared memory system, but also that any non-transactional store that is read by a transactional load within the transaction has also propagated throughout the distributed shared memory system. (Memory updates of transactional writes that are read by the memory transaction are guaranteed to have propagated throughout the distributed shared memory system because those memory updates could not be read by transaction 670 before they were visible to the entire distributed shared memory system). To ensure that the memory updates of non-transactional stores read by memory transaction 670 are also propagated throughout the distributed shared memory system, the processing of the tend instruction 676 of memory transaction 670 must not allow commitment of memory transaction 670 until the memory update of any non-transactional store read by memory transaction 670 is propagated throughout the distributed shared memory system.

Figure 7:
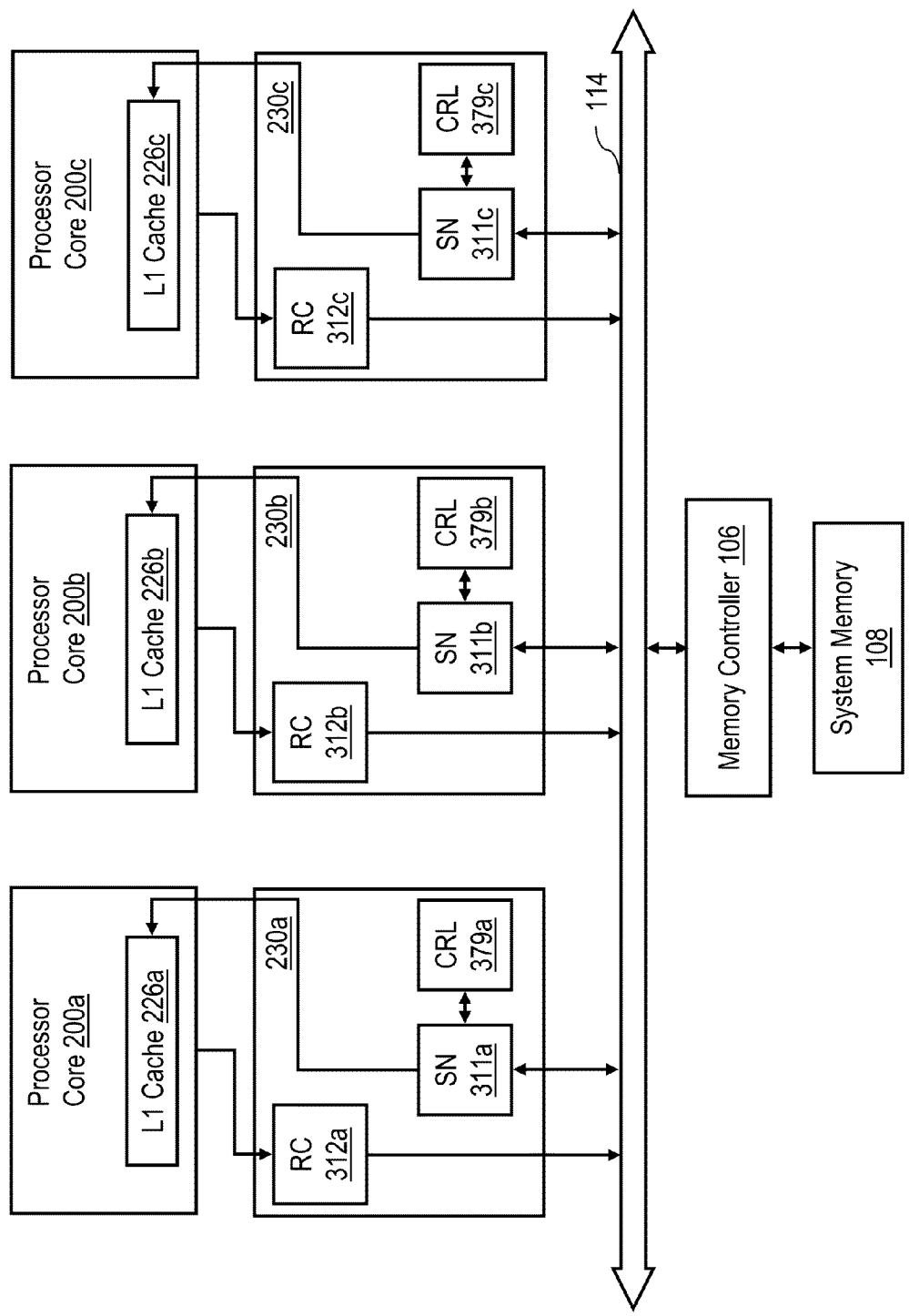
FIG. 7 illustrates a multiprocessor data processing system including at least three processor cores that execute the exemplary program of FIG. 6C.

With reference now to FIG. 7, there is illustrated a partial view of data processing system 100 of FIG. 1, which executes the multiprocessor program of FIG. 6C. In the view given in FIG. 7, processor cores 200a, 200b and 200c respectively correspond to processor cores 0, 1 and 2 of FIG. 6C. Further, an instance of causality resolution logic 379 is instantiated for and coupled to each instance of snooper 311, for example, as a component of the L2 cache 230 affiliated with each processor core 200.

Initially, processor core 200c holds a cached copy of the initial value (e.g., 0) of memory location A in its L1 cache 226c. Processor 200a begins execution of the multiprocessor program of FIG. 6C by executing store instruction 660. In response to execution of store instruction 660, processor core 200a transmits a store request to its L2 cache 230a, which allocates an RC machine 312 to service the store request. RC machine 312 broadcasts the store request onto local interconnect 114, and snoop machine 311c of the L2 cache 230c affiliated with processor core 200c registers the store request, including the processing unit that sourced the store request (i.e., the processing unit including processor core 200a). At this point, the memory update of store instruction 660 has not propagated to processor core 200c, but is instead queued for later processing, advantageously allowing processor core 200a to continue executing further instructions before the memory update of store instruction 660 is fully propagated.

Processor core 200b then executes load instruction 672 and, finding no copy of the target cache line associated with address A in its L1 cache 226b, transmits a read request to its L2 cache 230b. In response to the read request, L2 cache 230b allocates RC machine 312b to service the read request. In response to a miss of the read request in L2 cache 230b, RC machine 312b issues a read request onto local interconnect 114 to obtain the current value for address A. L2 cache 230a responds to the read request and provides the current value of address A to processor core 200b by cache-to-cache intervention. At this point a so-called "causality passing read" has occurred, that is, load instruction 672 has read the value of a store instruction that has not fully propagated through the entire distributed shared memory system. To account for this fact and to protect causality, causality resolution logic 379c in L2 cache 230c notes the successful read intervention between the vertical cache hierarchies of processor cores 200a and 200b for an address that is currently being invalidated by snoop machine 311c. In this manner causality resolution logic 379c directly tracks the causal dependency that processor 200b and its vertical cache hierarchy has on the memory update of store instruction 660 completing its propagation.

Processor 200b executes store instruction 674, which specifies an update of the value of address B to 1. In response to execution of store instruction 674, RC machine 312b issues a store request corresponding to store instruction 674 on local interconnect 114. In absence of an existing cached copy of the target cache line, memory controller 106 supplies the current value of address B from system memory 108 in response to the store request, and RC machine 312b updates L2 cache 230b accordingly. At this point processor core 1 executes tend instruction 676 to attempt to successfully commit transaction 670 and places a corresponding TEND request on local interconnect 114 to ensure that all prior memory updates by transactional stores in memory transaction 670 have been propagated throughout the distributed shared memory system and that any memory updates by non-transactional stores read by memory transaction 670 have similarly propagated throughout the distributed shared memory system. In this case, the memory update of store instruction 674 has fully propagated throughout the distributed shared memory system because no other caches held a copy of the cache line associated with address B. However, had any such copy existed and had the memory update not been fully complete, a snoop machine 311 in those caches, which noted the initial processor core 200 issuing the store, would be active and would provide a retry response to the snooped TEND request from that processor core 200 (forcing the TEND request to be reissued) until the invalidation of the cached copy of the cache line completes.

In the case at hand, the TEND request is not from the processor core 200 that initiated the store request, and therefore snoop machine 311c will not provide a retry response to the TEND request. However, causality resolution logic 379c has a causal dependency for processor 200b and its vertical cache hierarchy and issues on local interconnect 114 a retry response to the TEND request because the TEND request was issued from a processor core 200 that was the recipient of a causality passing read of the same address that snoop machine 311c is processing. In this manner, causality resolution logic 379 directly tracks which processor cores 200 have a causality dependency due to reading a memory update of a non-transactional store that was not fully completed for the processor core with which causality resolution logic 379 is associated.

It should be noted that, in general, causality resolution logic 379 must maintain a list capable of representing all the processors cores 200 in the data processing system to provide causality in cases in which the causality dependency chain passes through more than one processor core (e.g., a test where a first processor stores a location, a second processor reads that location and then stores a first flag variable, a third processor loads the first flag variable and writes a second flag in a transaction, and then a final thread reads the second flag and then the initial location). In such an implementation, a TEND request issued from any processor core with a causal dependency on the target address being invalidated by the snoop machine 311 associated with the instance of causality resolution logic 379 is retried. In a large SMP, however, such an embodiment can be prohibitive in cost and many implementations of causality resolution logic 379 only precisely track causal dependency chains of a certain fixed depth (e.g., two or three processors) and in the presence of longer dependency chains resort to pessimistically retrying all TEND requests until the cache line invalidations necessitated by the store instruction have completed processing.

To summarize, causality resolution logic is utilized to detect the occurrence of causal dependency chains, to a depth determined by the embodiment, on a pending store that has not completed processing throughout the entire distributed shared memory system. These causal dependencies are utilized to stall the completion of TEND requests from those processor cores with a causal dependency on the incomplete (pending) stores. In this manner, the memory transaction cannot complete (and therefore make its own stores visible), until the stores the memory transaction has read (i.e., those in the causal dependency chain of the memory transaction) have first completed throughout the distributed shared memory system. Only after these stores in the memory transaction's causal dependency chain (and the transactional stores of the memory transaction itself, though this is guaranteed by snooper 311 instead of causality resolution logic 379) have completed, may the TEND request complete, leading to the memory transaction successfully committing if no conflicts have occurred during its execution.

In other embodiments, additional causality resolution logic may be required to ensure the causality of memory operations. For example, in an implementation that contains a write-through L1 cache shared by a multithreaded processor core followed by a shared L2 store queue, it is possible for different threads (i.e., logically different processor cores from the point of view of software) to read stored values from the L1 cache before these stores have even propagated to the L2 cache, much less to the entire distributed shared memory system. In such an implementation, the tend instruction must act as a barrier for transactional stores in the given thread. This behavior ensures that the transactional stores are propagated to the system interconnect and the necessary snoop machines 311 so that the tend instruction can ensure, when trying to complete the memory transaction, that all of the cache line invalidations required by the memory transaction's stores have fully propagated. In addition, the tend instruction must act as a barrier for non-transactional stores that have been (or may have been) read by transactional loads within the transaction. In the simplest (and most common embodiment), all non-transactional stores within the shared store queue are treated as if they have come from a single thread for purposes of retrying the TEND request.

In this manner, all non-transactional stores from which any transaction has (or may have) read that have not been fully propagated are broadcast to snoop machines 311 as necessary before a TEND request for any transaction from that multithreaded processor core is presented on local interconnect 114. In such an embodiment, snoop machines 311 treat all stores coming from a given multithreaded processor core in a unified manner and will retry any TEND request, as necessary, from that given multithreaded processor core regardless of thread. In this embodiment, causality resolution logic 379 is not involved in monitoring these intra-core dependencies, but instead is utilized solely to manage causality dependencies between multithreaded processor cores.

The exact placement and details of the necessary causality resolution logic will vary with the particulars of given embodiment and will be apparent to those skilled in the art given the teachings herein. In general, at any point where a load may return the value of a store that has not fully propagated throughout the entire distributed shared memory system, a mechanism must be provided to ensure that any store with a causal dependency to a different processor core is noted and that causal dependency delays the processing of a tend instruction (or other semantic) ending a memory transaction until such time as the stores in the causal dependency chain of the memory transaction have completed propagating.

Figure 8:
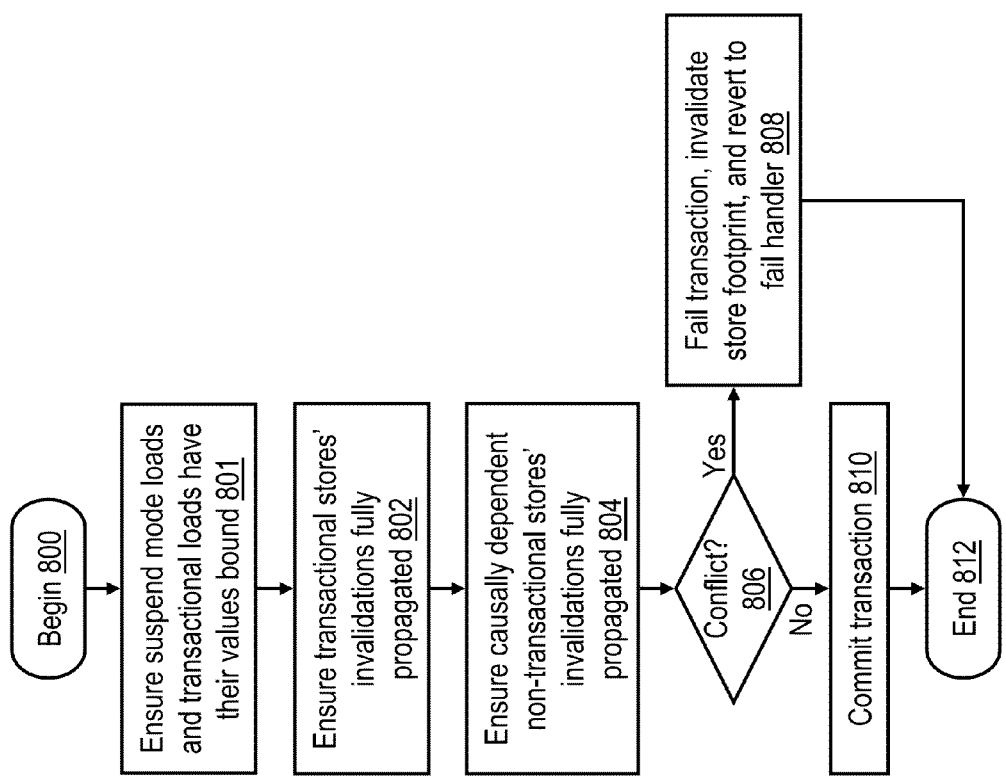
FIG. 8 is a high level logical flowchart of an exemplary method by which a multiprocessor data processing system ensures causality in execution of a program including both transactional and non-transactional memory accesses.

Referring now to FIG. 8, there is depicted a high level logical flowchart of the processing of a tend instruction terminating a memory transaction in accordance with one embodiment. The process begins at block 800, for example, in response to initiation of execution of a tend instruction within the LSU 202 of a processor core 200. The process of FIG. 8 proceeds from block 800 to block 801, which depicts LSU 202 ensuring that all prior suspend mode load instructions and all prior transactional load instructions have their values bound. This check ensures the transactional load instructions are present in the memory transaction's footprint and that the suspend mode load instructions have obtained their values. The process proceeds from block 801 to block 802, which depicts ensuring that the cache line invalidations necessitated by transactional stores within the memory transaction have been fully propagated throughout the distributed shared memory system. In the embodiment described above, verification of propagation of the cache line invalidations necessitated by transactional stores is accomplished by one or more snoop machines 311 providing a retry response to any applicable TEND request on local interconnect 114 until the previous transactional stores have invalidated all cached copies of the memory location(s) targeted by the memory updates. The process then proceeds to step 804, which illustrates ensuring that the cache line invalidations necessitated by causally dependent non-transactional stores have completely propagated throughout the distributed shared memory system. In the embodiment described above, verification of propagation of the cache line invalidations necessitated by non-transactional stores is accomplished by one or more instances of causality resolution logic 379 providing a retry response to any applicable TEND request on local interconnect 114 until the previous memory updates of causally dependent non-transactional stores have invalidated all cached copies of the memory location(s) targeted by the memory updates.

At block 806, transactional control logic 382 determines whether or not a conflict has occurred for the memory transaction. In response to transactional control logic 382 determining that a conflict has occurred, the process proceeds to block 808, which depicts transactional control logic 382 invalidating the tentative store footprint of the memory transaction (e.g., as recorded in L2 cache 230) and indicating via pass/fail indication 384 that the memory transaction has failed. As further illustrated at block 808, in response to pass/fail indication 384 processor core 200 updates its condition code register and transfers control to the fail handling branch instruction within the memory transaction (block 808). The process then terminates at step 812.

Returning to block 806, in response to transactional control logic 382 determining that no conflict has occurred during execution of the memory transaction, the process proceeds to step 810, which depicts TM control logic 382 committing the transaction, inter alia, by causing the transaction footprint to be committed to the distributed shared memory system (e.g., by updating one or more coherence states in the directory 308 of L2 cache 230 to indicate the transaction footprint is valid and available for access by all threads) and indicating to processor core 200 via pass/fail indication 384 that the memory transaction passed. The process then terminates at block 812.

Memory transactions, as described above, enable a programmer to enforce execution of groups of load and/or store instructions by a data processing system in an atomic fashion and to fail and repeat the memory transactions as necessary to preserve the appearance of atomicity of the storage accesses of the memory transactions in the presence of conflicts with other storage accesses. While memory transactions provide a valuable and needed capability, there is also a need to be able to speculatively execute a block of instructions, particularly including store instructions, and then to be able to discard the results of that execution under software control without regard to the existence of conflicting accesses. For example, some programming models require that the execution of certain code sequences do not cause a fault. To avoid such faults, an additional code sequence is typically required to validate that the inputs to the code sequence will not produce a fault before the sequence is executed. This pre-validation can incur significant additional overhead. However, with a "rewind only" transaction (ROT) as described herein, the code sequence may be speculatively executed without the additional overhead of validation and may then be rewound if a fault occurs.

Discarding or "rewinding" the storage-modifying effects of a store instruction has traditionally not been supported in prior processors, and therefore the amount of speculation permitted for a store instruction (and for instructions dependent on that store instruction) was severely limited. As described herein, the mechanisms supporting transactional memory may be adapted, reused and extended to efficiently support a discardable speculative execution mechanism for blocks of instructions, specifically those including store instructions. Without the enhancements described herein, a full memory transaction would be required to rewind store instructions, at additional cost as described below.

To support rewinding the storage-modifying effects of store instructions, a distinct type of memory transaction referred to herein as a "rewind only" transaction (ROT) is introduced. Unlike a traditional memory transaction, a ROT, by definition, does not require any conflict detection or atomicity guarantees, but rather only provides a semantic to enforce the discarding of the execution results of a group of one or more speculatively executed instructions that may include one or more store instructions. Furthermore, the commitment of a ROT does not depend upon or require the propagation of the invalidations of causally dependent non-transactional stores through the distributed shared memory system, as described above with reference to block 804 of FIG. 8.

While conflict detection is not required for the semantic definition of a ROT, a typical implementation will provide conflict tracking for store instructions within the ROT, if only to avoid additional unnecessary complexity in the design of the processor core and cache hierarchy at little additional benefit. So while conflict tracking is not required for a ROT as a matter of definition (because atomicity is not preserved by a ROT), as a matter of implementation, hardware supporting execution of ROTs will typically provide conflict tracking for the store footprint of a ROT for simplicity.

The utility of retaining store footprint conflict tracking for ROTs can be seen in the management of conflicts between different threads on a multi-threaded processor core sharing a common write-through L1 cache. In such a multi-threaded processor core, if multiple threads were concurrently executing ROTs including store instructions targeting a given cache line, the L1 cache would have to be able to maintain a different image of the given cache line for each thread (i.e., the L1 cache would have to be able to hold multiple concurrently active images of any given cache line). Furthermore, when each ROT committed, the L1 cache would have to be able to merge the updates made to the cache line by the thread committing the ROT into the remaining concurrent copy or copies of the cache line—an operation that is exceptionally complex. In general, it is far more efficient and less costly to employ the existing conflict tracking mechanisms for the store footprint of a ROT as if it were a non-ROT memory transaction.

Typically, load instructions will significantly outnumber store instructions in a memory transaction. For TM control logic 380 of a given capacity, a significantly larger transaction can therefore be accommodated as a ROT rather than a non- ROT memory transaction (which, in the absence of ROTs would have to be employed to rewind speculatively executed store instructions). Furthermore, a ROT can successfully complete in the presence of false sharing conflicts (i.e., a conflict that occurs, for example, when a store instruction from another thread writes within a cache line in the footprint of a memory transaction, but does not actually alter the data being manipulated by the memory transaction). Because conflicts are tracked on a per cache-line basis and not on a per-location basis, such false sharing conflicts cause the failure of memory transactions that are not strictly required by the definition of a memory transaction, but must occur due to the limitations of the conflict tracking implementation. ROTs, however, are more resilient in the presence of such false sharing conflicts than the non-ROT memory transactions that would have to be used in the absence of support for ROTs.

Figure 9:
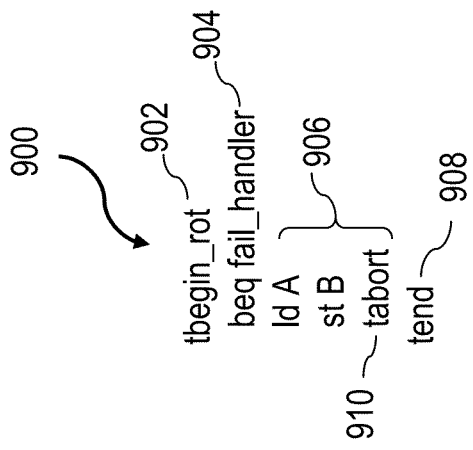
FIG. 9 is an illustrative example of a rewind-only memory in accordance with one embodiment.

With reference now to FIG. 9, an illustrative example of a representative ROT 900 is illustrated. ROT 900 may form, for example, a portion of a multiprocessor program.

ROT 900 begins with a unique instruction, tbegin_rot 902, which identifies the beginning of a ROT. Similar to a normal (i.e., non-ROT) memory transaction 400 of FIG. 4, the instruction immediately following tbegin_rot instruction 902 is a branch instruction 904 that redirects execution to a failure handling routine in response to the ROT 900 either failing or (as explained below) aborting under software control. Branch instruction 904 is followed by a transaction body 906, which may contain transactional memory access (e.g., load and/or store) or other instructions, and possibly one or more tabort instruction(s) 910. If present, tabort instruction 910 directs execution of ROT 900 to be aborted and execution results of ROT 900 to be discarded. Although not illustrated in FIG. 9, ROT 900 may further optionally include bypass instructions that determine if ROT 900 should be aborted (e.g., based on a variable value read from the distributed shared memory system by a transactional load of the ROT or the availability of a system resource) and that, responsive to the determination, either cause tabort instruction 910 to be executed or cause execution to branch around tabort instruction 910 to one or more transactional instruction including tend instruction 908, which, when executed, causes ROT 900 to be committed (and, in particular, makes the storage-modifying effects of the store instructions within transaction body 906 non-speculative).

If a tabort instruction 910 within a ROT 900 is executed, the execution results of ROT 900 are discarded, a condition code register is updated to indicate that a tabort instruction 910 caused the ROT to fail, and control passes to branch instruction 904, which is taken based on the value present in the condition code register. Execution of a tabort instruction 910 is the primary way in which the speculative execution results of a ROT 900 are discarded and control is passed to the fail handler via branch instruction 904. Among other reasons, a ROT 900 (or non-ROT memory transaction) may also fail and pass control to the fail handler via branch instruction 904 (or branch instruction 404) due to a capacity overflow (overflowing the capacity of TM logic 380) or due to execution of an instruction (e.g., a cache-inhibited load or store instruction) that can have untracked side effects and therefore is inherently unable to be re-executed and consequently cannot legally appear in a ROT or memory transaction (which may have to be executed several times to successfully commit).

Figure 10:
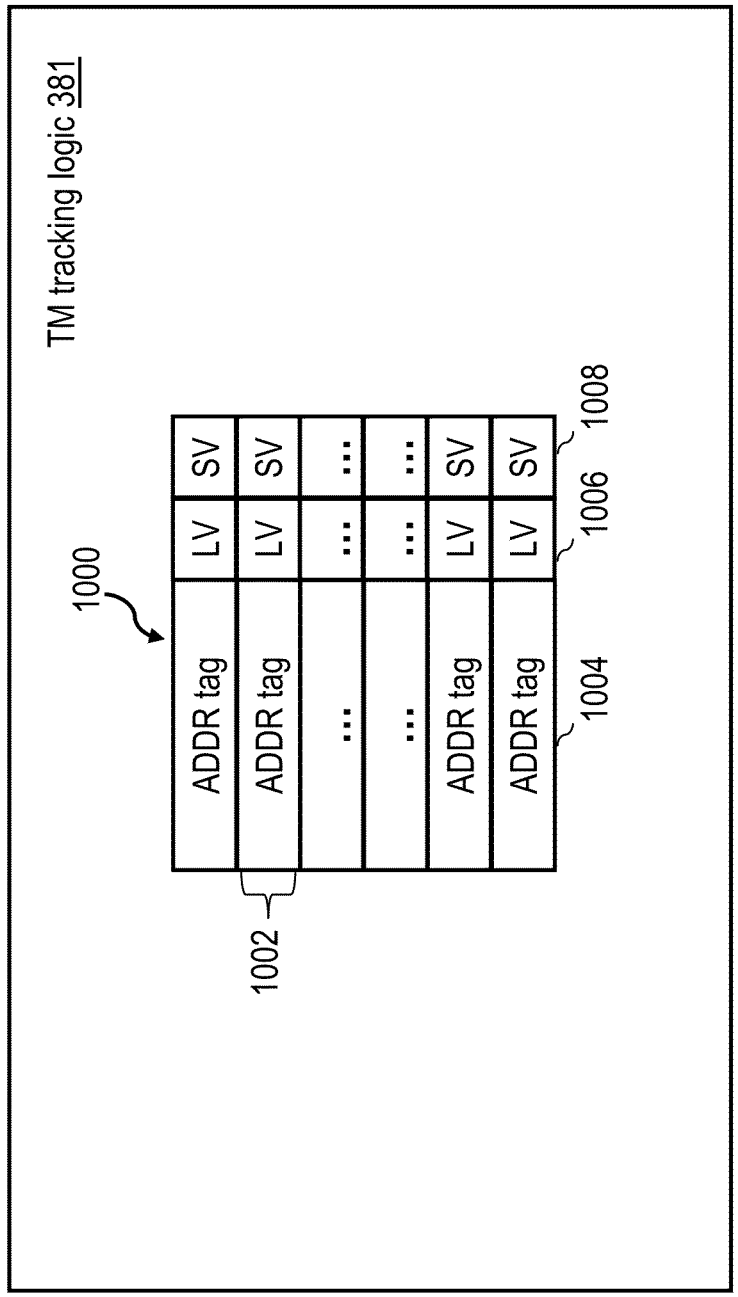
FIG. 10 is more detailed view of transactional memory tracking logic in accordance with one embodiment.

Referring now to FIG. 10, there is illustrated a more detailed view of TM tracking logic 381 in accordance with one embodiment. As depicted, TM tracking logic 381 includes a TM directory 1000, which contains a number of entries 1002 for tracking the cache lines within the load and store footprints of ROTs and/or non-ROT memory transactions. In the depicted embodiment, each entry 1002 within TM directory 1000 includes three fields: address tag field 1004, load valid (LV) field 1006, and store valid (SV) field 1008. Address tag field 1004 indicates the real memory address of a cache line that is in the footprint of the ROT or non-ROT memory transaction. SV field 1006 and LV field 1008 respectively indicate whether the cache line is part of the store footprint or load footprint of the memory transaction. In at least one embodiment, LV field 1006 and SV field 1008 are mutually exclusive, meaning that, for a given entry 1002, one or neither of LV field 1006 and SV field 1008 may be set concurrently but not both. When both of fields 1006 and 1008 are reset, the entry 1002 is invalid and no cache line is then being tracked by that entry 1002.

For a non-ROT memory transaction, when a transactional load is presented to TM logic 380 and there is no entry in TM directory 1000 for the target cache line of the transactional load, a new entry 1002 is allocated (possibly evicting an existing entry 1002), the address tag field 1004 of the new entry is updated with the address tag of the target cache line, and the LV field 1006 is set. If, on the other hand, an existing entry 1002 is already tracking the target cache line (and therefore either LV field 1006 or SV field 1008 is already set), no update to the existing entry 1002 is made because the target cache line of the transactional load is already being tracked.

As with a transactional load, if a transactional store of a non-ROT memory transaction is presented to TM logic 380 and there is no entry in TM directory 1000 for the target cache line of the transactional store, a new entry 1002 is allocated (possibly evicting an existing entry 1002), the address tag field 1004 of the new entry is updated with the address tag of the target cache line, and the SV field 1008 is set. If, on the other hand, an existing entry 1002 is already tracking the target cache line and LV field 1006 is set for that entry 1002, then LV field 1006 is reset, and SV field 1008 is set to indicate that this cache line is now part of the store footprint for the memory transaction. If SV field 1008 is already set for the existing entry 1002, no update to entry 1002 is performed.

In response to a ROT or non-ROT memory transaction committing or failing, TM tracking logic 381 clears the entries 1002 in TM directory 1000.

For a ROT, TM tracking logic 381 updates TM directory 1000 as described above for transactional stores of non-ROT memory transactions. However, for loads within the ROT, TM tracking logic 381 does not update TM directory 1000 because the load footprint is not tracked for conflicts in a ROT. This behavior can be implemented in at least two ways. In a first implementation, all non-transactional load and store operations transmitted from a processor core 200 to its L2 cache 230 are identified as either being a non-transactional load or store, a non-ROT transactional load or store, or as a ROT transactional load or store. In this case, TM tracking logic 381 ignores ROT transactional loads for purposes of updating TM directory 1000.

In another implementation, all non-transactional loads and stores and ROT loads are identified as being non-transactional and are accordingly ignored by TM tracking logic 381 for purposes of updating TM directory 1000. ROT transactional stores and non-ROT transactional loads and stores are identified as being transactional, and TM tracking logic 381 accordingly updates TM directory 1000 as described above for non-ROT transactional loads and stores. In either implementation, TM tracking logic 381 preferably does not update TM directory 1000 for ROT transactional loads.

Figure 11:
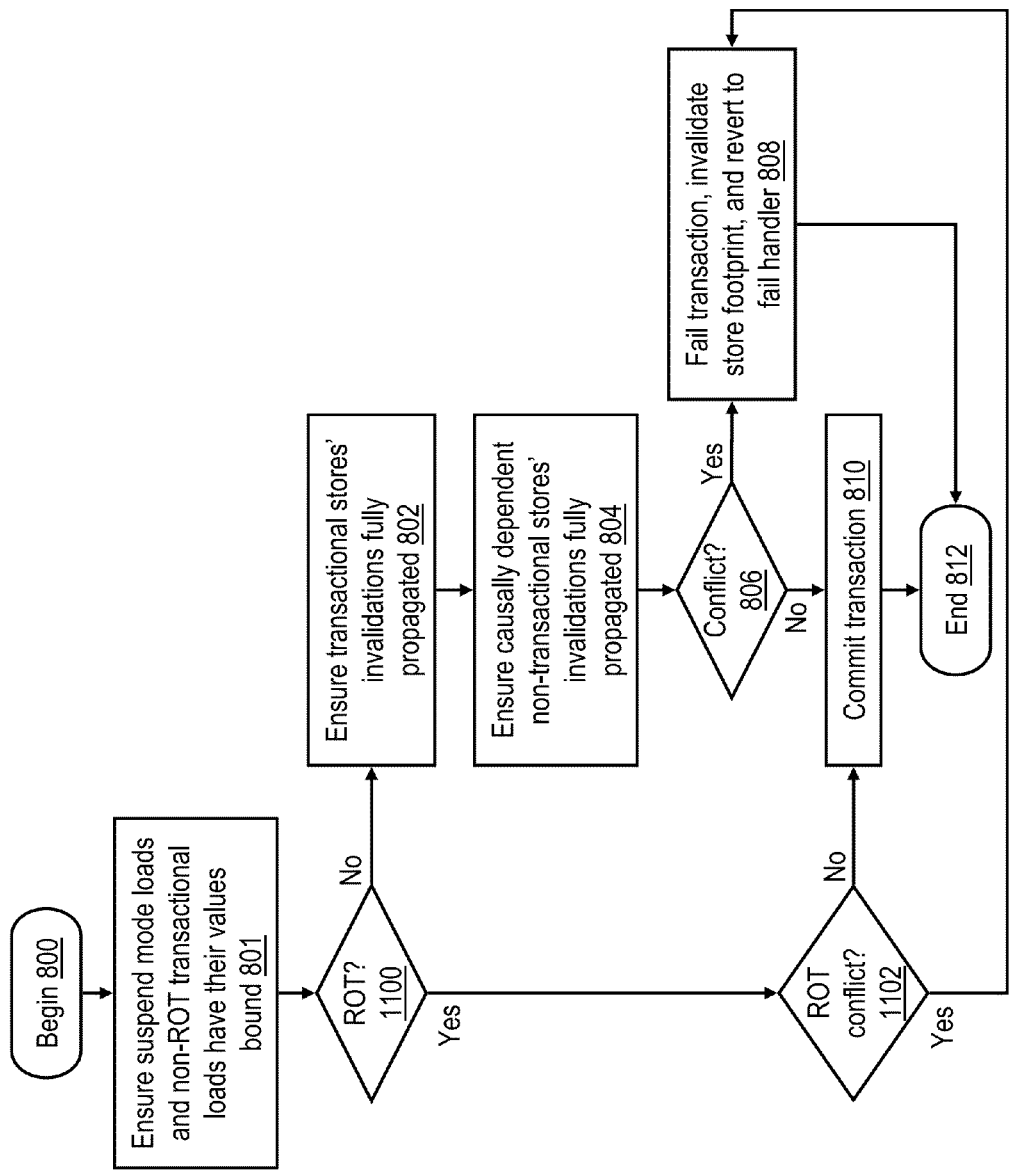
FIG. 11 is a high level logical flowchart of an exemplary method by which a rewind-only transaction is processed in accordance with one embodiment.

With reference now to FIG. 11, there is illustrated a high level logical flowchart of a method of processing of a tend instruction terminating a non-ROT memory transaction or a ROT in accordance with one embodiment. For ease of understanding, like reference numerals are utilized to denote steps corresponding to those depicted in FIG. 8.

The process of FIG. 11 begins at block 800, for example, in response to initiation of execution of a tend instruction within the LSU 202 of a processor core 200. LSU 202 then ensures at block 801 that all prior suspend mode load instructions and all prior non-ROT transactional load instructions have their values bound. This check ensures the non-ROT transactional load instructions are present in the memory transaction's footprint and that the suspend mode load instructions have obtained their values. LSU 202 then determines at block 1100 whether or not the memory transaction terminated by the tend is a ROT or non-ROT memory transaction. In response to a determination that the memory transaction is a non-ROT memory transaction, the process continues to block 802 and subsequent blocks, which have been described.

Returning to block 1100, in response to a determination that the tend instruction terminates a ROT, blocks 802, 804 and 806 are bypassed as unnecessary for a ROT, and control passes to block 1102. Block 1102 depicts LSU 202 querying TM logic 380 whether a conflict for the ROT's store footprint was detected by TM tracking logic 381 (as opposed to a conflict on either the load or store footprint for a non-ROT memory transaction). In response to TM logic 380 indicating a conflict has been detected for the store footprint of the ROT, the process proceeds to block 808, which depicts failing the ROT and invalidating its store footprint as described above. In response to TM logic 380 indicating at block 1102 that no conflict for the ROT has been detected, the process proceeds to block 810, which illustrates commitment of the ROT to the distributed shared memory system as described above. It should again be noted that commitment of the ROT does not require observance of causality, as described above with reference to block 804. Following either block 808 or block 810, the process concludes at block 812.

In at least some embodiments, memory transactions, including ROTs and/or non-ROT transactions, can be nested to any arbitrary depth, meaning that a ROT or a non-ROT transaction can contain one or more other memory transactions. In at least some embodiments, so-called "flat nesting" is preferably employed in which memory transactions contained within the outermost memory transaction are subsumed by the outermost enclosing memory transaction into a single memory transaction that either commits as a whole or fails as a whole.

Figures 12, 13:
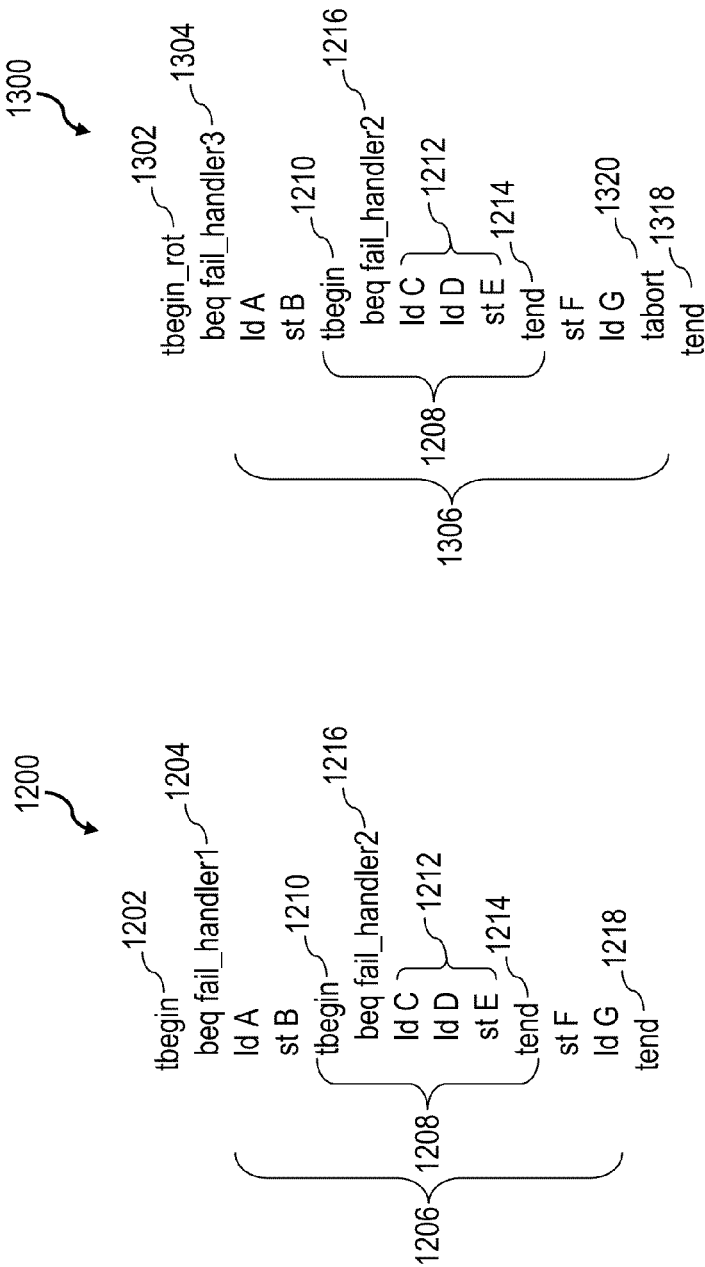
FIG. 12 is an illustrative example of a representative memory transaction containing a nested memory transaction in accordance with one embodiment.
FIG. 13 is an illustrative example of a representative rewind-only memory transaction containing a nested memory transaction in accordance with one embodiment.

With reference now to FIG. 12, there is illustrated a representative non-ROT memory transaction 1200, which contains a nested memory transaction. Memory transaction 1200 may, for example, form a portion of a multiprocessor program.

As before, an outermost or enclosing memory transaction 1200 begins at a tbegin instruction 1202, which is followed by a branch instruction 1204 that, if the indicated branch is taken, invokes execution of a first fail handler routine. Outermost memory transaction 1200 additionally includes a transaction body 1206 that includes transactional memory access (e.g., load and/or store) instructions and optionally one or more additional instructions.

Transaction body 1206 further includes a nested memory transaction 1208 initiated by tbegin instruction 1210, which is followed by a branch instruction 1216 that, if the indicated branch were to be taken, would redirect execution to a second fail handler routine associated with nested memory transaction 1208. Nested memory transaction 1208 additionally includes a transaction body 1212 comprising one or more transactional memory access (e.g., load and/or store) instructions, zero or more optional additional instructions, and a tend instruction 1214.

In the example shown, the branch to the second fail handler routine will never be taken because any conflict detected for memory transaction 1200 will redirect execution to branch instruction 1204. Despite this fact, a branch instruction to a fail handler routine is typically provided for all memory transactions because of the difficulty in determining, a priori, whether or not a memory transaction will be executed as part of a nested memory transaction. (For example, a given memory transaction could be executed directly or could alternatively be executed as part of a function call within another memory transaction. In the former case, the memory transaction would not be nested, while in the latter the memory transaction would be nested.)

To implement the "flat nesting" noted above, the load and store footprints of memory transaction 1200 include the sets of memory addresses accessed by transactional load and store instructions, respectively, within transaction bodies 1206 and 1212. In addition, if a tabort instruction were to be executed anywhere within memory transaction 1200, control would transfer to branch instruction 1204. In essence, tbegin instruction 1210 and tend instruction 1214 of nested memory transaction 1208 act like nop (noop) instructions, with the exception of causing updates to be made to a nesting level register and transaction mode register as described below. It should be further noted that memory transaction 1208 could be replaced by a ROT without any change in the handling of the nested memory transactions.

In at least some embodiments, one or more ROT or non-ROT memory transactions may also be nested within a ROT. For example, FIG. 13 illustrates a ROT 1300 that begins at a tbegin_rot instruction 1302, which is followed by a branch instruction 1304 that, if the indicated branch is taken, invokes execution of a third fail handler routine. ROT 1300 additionally includes a transaction body 1306 that includes transactional memory access (e.g., load and/or store) instructions, optionally one or more additional instructions, and optionally a tabort instruction 1320. In the illustrated example, transaction body 1306 further includes a nested non-ROT memory transaction 1208 as previously described. In one preferred embodiment, transactional memory access instructions within a ROT (e.g., ld A and st B) that precede a nested non-ROT memory transaction (e.g., memory transaction 1208) are handled as ROT transactional memory accesses as described above with reference to FIGS. 9-11, and transactional memory access instructions within a ROT that fall within or follow a nested non-ROT memory transaction (e.g., ld C, ld D, st E, st F and ld G) are handled as non-ROT transactional memory accesses as described above with reference to FIGS. 7-8. In other words, once a nested memory transaction enters a non-ROT mode, either at the initial tbegin instruction or at a subsequent nested tbegin instruction (such as tbegin instruction 1210 in ROT 1300), the memory transaction remains in a non-ROT mode for the remainder of all the nested memory transactions, regardless of memory transaction type. In this manner, nested transactions retain the advantages of a ROT until the first, potentially nested, non-ROT transaction in the overall collection of nested transactions is encountered.

Figure 14:
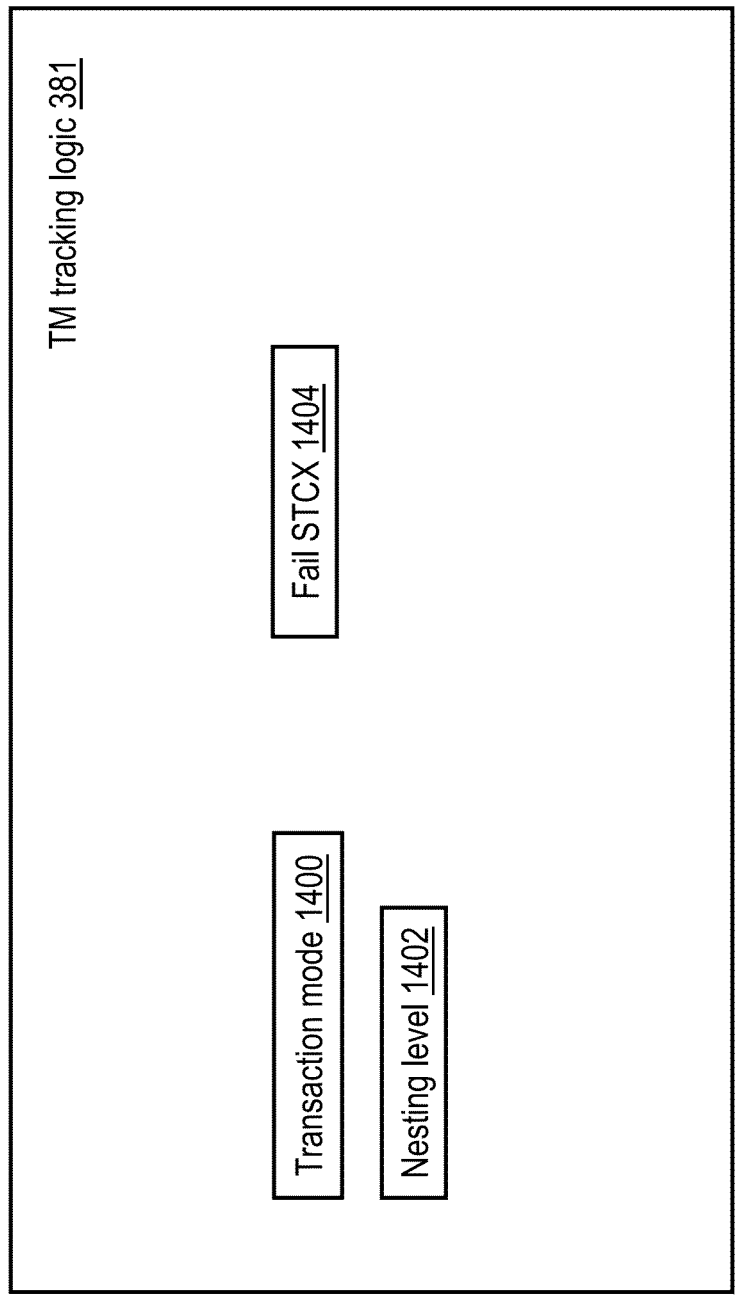
FIG. 14 illustrates a portion of transaction memory (TM) tracking logic that may be employed in processing nested memory transactions in accordance with one embodiment.

To support nested memory transactions, TM tracking logic 381 is preferably augmented as depicted in FIG. 14. As depicted, in additional to the previously described TM directory 1000, TM tracking logic 381 includes a transaction mode register 1400 and a nesting level register 1402. Transaction mode register 1400 indicates a current mode of a memory transaction under execution (e.g., ROT or non-ROT). For nested memory transactions in which all the nested transactions are the same type, transaction mode register 1402 is set at the outermost tbegin or tbegin_rot instruction and retains its value throughout the nested memory transaction. Nesting level register 1402 indicates the current nesting depth of the memory transaction under execution. At each tbegin or tbegin_rot instruction within the nested memory transactions, nesting level register 1402 is incremented, and at each tend instruction within the nested transactions, nesting level register 1402 is decremented. If the nesting level exceeds the nesting depth that can be expressed by nesting level register 1402, the tbegin instruction fails at execution, setting a condition code, and execution of the fail handler routine is invoked.

Figure 15:
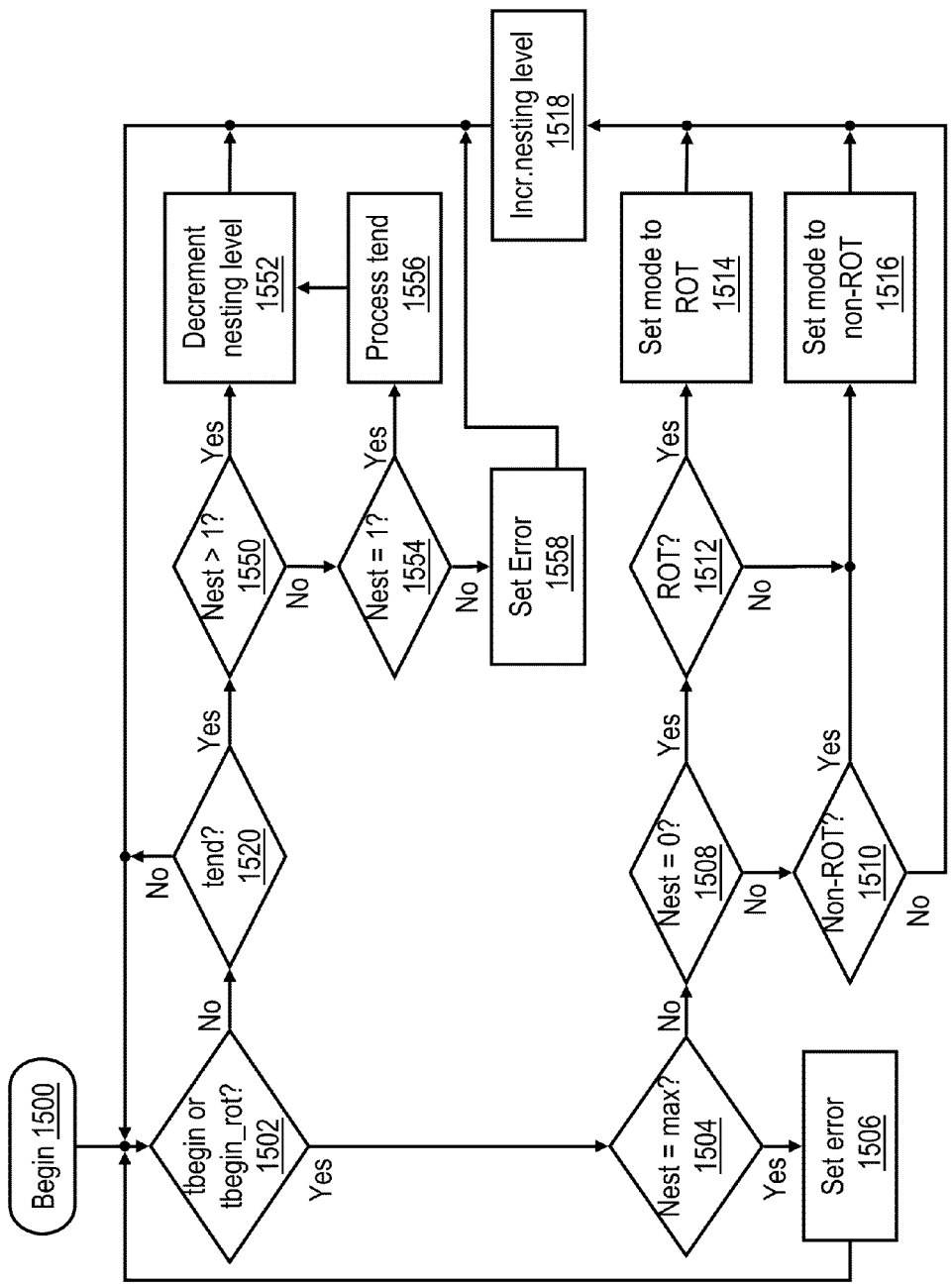
FIG. 15 is a high level logical flowchart of an exemplary method of processing instructions delimiting nested memory transactions in accordance with one embodiment.

Referring now to FIG. 15, there is depicted a high level logical flowchart of the processing of transaction memory requests corresponding to instructions delimiting nested memory transactions (e.g., tbegin, tbegin_rot, and tend instructions) of possibly differing types (ROT and/or non-ROT memory transactions). The illustrated process begins at block 1500 and proceeds to block 1502, which depicts TM logic 380 determining if a tbegin or tbegin_rot request corresponding to a tbegin or tbegin_rot instruction initiating a memory transaction has been received from the affiliated processor core 200. If not, the process passes to block 1520, which is described below. If so, the process proceeds to block 1504, which depicts TM control logic 382 testing nesting level register 1402 to determine if nesting of memory transactions has reached its maximum supported depth, for example, as determined by the size of nesting level register 1402. If so, TM control logic 382 sets a condition code register in processor core 200 to indicate the error condition that the memory transaction nesting has exceeded the maximum allowable depth (block 1506). The process then returns to block 1502, which has been described.

Returning to block 1504, in response to TM control logic 382 determining the maximum nesting level is not exceeded, TM tracking logic 381 sets transaction mode register 1400 to indicate the appropriate mode of operation (i.e., ROT or non-ROT) utilizing, for example, the process illustrated at blocks 1508-1516. In particular, TM tracking logic 381 determines at block 1508 if the nesting level is zero (i.e., if the tbegin or tbegin_rot request corresponds to the initiation of an outermost or enclosing memory transaction). If not, the process passes to block 1510, which is described below. If, however, the nesting level is equal to zero, TM tracking logic 381 further determines at block 1512 whether the memory transaction is a ROT (i.e., the memory transaction request is a tbegin_rot request). If not (i.e., the memory transaction request is a tbegin request corresponding to the tbegin instruction of a non-ROT memory transaction), the process proceeds to block 1516, which illustrates TM tracking logic 381 setting transaction mode register 1400 to indicate a non-ROT mode. If, on the other hand, TM tracking logic 381 determines at block 1512 that the memory transaction request is a tbegin_rot request corresponding to a tbegin_rot instruction initiating a ROT, TM tracking logic 381 sets transaction mode register 1400 to indicate a ROT mode (block 1514). After either block 1514 or block 1516, the process then proceeds to block 1518, which is described below.

Referring now to block 1510, which is reached only if the detected memory transaction is a nested memory transaction enclosed within another enclosing memory transaction, TM tracking logic 381 determines if the memory transaction request is a tbegin request corresponding to a nested non-ROT memory transaction initiated by a tbegin instruction (as opposed to a tbegin_rot). If so, TM tracking logic 381 sets transaction mode register 1400 to indicate a transition to the non-ROT mode at block 1516. If, however, TM tracking logic 381 determines at block 1510 that the memory transaction request is a tbegin_rot request corresponding to a tbegin_rot instruction initiating a nested ROT, the process then proceeds directly to block 1518 without updating transaction mode register 1400. To summarize, TM tracking logic 381, responsive to memory transaction requests (i.e., tbegin and tbegin_rot requests) corresponding to tbegin and tbegin_rot instructions, sets transaction mode register 1400 to the transaction mode corresponding to the type of the outermost memory transaction (ROT or non-ROT) and then sets transaction mode register 1400 to non-ROT mode in response to encountering any subsequent non-ROT memory transaction nested within the outermost memory transaction.

At depicted at block 1518, TM control logic 381, responsive to the tbegin or tbegin_rot request corresponding to a tbegin or tbegin_rot instruction initiating a memory transaction, also increments nesting level register 1402 to indicate the present depth of nesting. The process then returns to block 1502, which has been described.

Referring now to block 1520, TM tracking logic 381 determines whether the received request is a tend request corresponding to execution of a tend instruction that terminates a memory transaction. If not, the process returns to block 1502 to await receipt of the next tbegin, tbegin_rot, or tend request, as has been described. If, however, TM tracking logic 381 determines that the memory transaction request is a tend request generated by execution of a tend instruction in the affiliated processor core 200, TM tracking logic 381 queries nesting level register 1402 to determine if the current nesting level is greater than one, indicating that the tend instruction does not terminate the outermost memory transaction of a collection of nested memory transactions. If so, TM tracking logic 381 simply decrements nesting level register 1402 to update the current nesting depth (block 1552). In other respects, the tend request and associated tend instruction are treated as a no-ops, as noted above. The process then returns to block 1502.

Returning to block 1550, if nesting level register 1402 has a value not greater than one, the process proceeds to block 1554, which depicts TM tracking logic 381 determining if the nesting level indicated by nesting level register 1402 equals one, indicating that the tend instruction corresponding to the received tend request terminates the outermost memory transaction. If so, the tend request is processed according to the process described above with reference to FIG. 11 (block 1556). In addition, TM tracking logic 381 decrements the nesting level indicated by nesting level register 1402, as described above with reference to block 1552.

Returning to block 1554, if the nesting level indicated by nesting level register 1402 is not one, then the nesting level must be zero (i.e., not one or greater than one). This condition indicates that an error has occurred due to the fact that a tend instruction has been executed without a corresponding tbegin or tbegin_rot instruction. Accordingly, TM tracking logic 381 sets an error indication to indicate detection of this error (block 1558). Thereafter, the process returns to block 1502 to await the next tbegin, tbegin_rot, or tend request.

Referring now to FIG. 16, there is depicted a conventional instruction sequence 1600 that includes an instruction pair that is intended to effect a conditional atomic update of a shared memory system. In particular, instruction sequence 1600 includes a load-and-reserve instruction (hereafter referred to by the mnemonic larx) 1602 that reads the value of a memory location and a store-conditional instruction (hereafter referred to by the mnemonic stcx) 1606 that conditionally updates the same memory location, if and only if the value read by larx instruction 1602 is a non-stale value (i.e., the latest value for the location in the coherence order for that memory location) at execution of the stcx instruction 1606. Otherwise, the conditional atomic update to the memory location will fail.

Upon execution of larx instruction 1602 by processor core 200, a load request is passed to L2 cache 230, and reservation control logic 390 (see, e.g., FIG. 3) places a so-called "reservation" on the target cache line containing the memory location read by larx instruction 1602 by setting reservation flag 392 if the value returned by larx instruction 1602 is non-stale and by loading reservation address register 391 with the address of the target cache line. Until reservation flag 392 is reset, reservation control logic 390 detects any storage updates to the cache line identified by reservation address register 391 by another processor core 200 and resets reservation flag 392 in response to detecting any such storage update.

Add instruction 1604 then updates the value read from the memory location (in this example, by adding one to the value read from the memory location). Of course, any of a variety of computations can be performed in lieu of add instruction 1604 to provide the particular type of atomic update desired by software. Stcx instruction 1606 then attempts to update the memory location with the updated value. If reservation flag 392 is still set and stcx instruction 1606 can obtain write permission for the cache line and write the cache line before any additional update to the cache line containing the memory location occurs, the conditional atomic storage update succeeds and sets a condition code register in processor core 200 to indicate success. If, on the other hand, stcx instruction 1604 cannot obtain write permission and write the target cache line before any additional storage update to the target cache line occurs or before reservation flag 392 is reset, the conditional atomic storage update fails (i.e., does not update memory) and sets a condition code register in processor core 200 to indicate failure. Branch instruction 1608 tests the condition code register for failure, and in response to detecting failure of the conditional atomic update to memory, transfers control back to larx instruction 1602 to again attempt the atomic update of memory. Whenever a processor core 200 executes a stcx instruction (whether successful or not), reservation control logic 390 of the associated L2 cache 230 resets reservation flag 392. Similarly, whenever a processor core 200 executes a larx instruction, reservation control logic 390 of the associated l2 cache 230 overwrites any existing values in reservation address register 391 and reservation flag 392 with values for the most recently executed larx instruction.

A larx/stcx instruction pair with the proper looping construct achieves an atomic update by repeating the read, compute, and conditional write process until the conditional write can successfully commit in an atomic fashion. In general, several iterations of the loop construct may need to be executed in order for the stcx instruction to successfully make the conditional atomic update to memory. Semantics for the interaction of memory transactions and atomic memory updates will now be described.

With reference now to FIG. 17, there is shown a representative memory transaction 1700 that may, for example, form a portion of a multiprocessor program. Memory transaction 1700 has a number of associated larx/stcx instruction pairs that will be failed by the exemplary data processing architecture described herein based on the placement of the larx/stcx instructions relative to memory transaction 1700. Such conditional atomic update failures are in addition to failures that may opportunistically be caused by competing updates by other processor cores 200.

In FIG. 17 (and in subsequent FIGS. 18, 19 and 20), the branch instructions typically following the stcx instruction of each larx/stcx instruction pair and the fail handler branch instruction of the memory transaction that redirects execution to the fail handler routine are omitted for clarity. As previously described, memory transaction 1700 of FIG. 17 begins with a tbegin instruction 1702, ends with a tend instruction 1704, and includes a suspended region 1706 initiated by a tsuspend instruction 1708 and terminated by a tresume instruction 1710.

A first larx/stcx instruction pair, which includes larx instruction 1720 and stcx instruction 1722, straddles the tbegin instruction 1702 that initiates memory transaction 1700. If execution of memory transaction 1700 were to be repeated due to an occurrence of a conflict, larx instruction 1720 may be not executed again, and the stcx instruction 1722 could fail repeatedly. Even if the loop construct associated with larx instruction 1720 and stcx instruction 1722 were to loop execution back to larx instruction 1720, that construction would cause tbegin instruction 1702 of memory transaction 1700 to execute again and increase the nesting level incorrectly. As such, reservation control logic 390 preferably resets reservation flag 392 in response to a tbegin request corresponding to execution of the outermost tbegin instruction (or a the outermost and all nested tbegin instructions in an alternative embodiment), thus causing the failure of any larx/stcx instruction pair that straddles such a tbegin instruction.

A second larx/stcx instruction pair, which includes larx instruction 1724 and stcx instruction 1726, similarly straddles tsuspend instruction 1708. In this case, stcx instruction 1726 should not be allowed to succeed because the success or failure of its conditional atomic memory update is based on a transactional larx instruction 1724 that may be flushed and re-attempted, but stcx instruction 1726 (if it were to succeed) would be unconditionally written to the shared system memory because of its location within suspended region 1706 of memory transaction 1700. For this reason, reservation control logic 390 preferably fails any stcx instruction in a suspended region based on a reservation established within the memory transaction but outside of the suspended region.

A third larx/stcx instruction pair, which includes larx instruction 1728 and stcx instruction 1730, straddles the tresume instruction 1710 that terminates suspended region 1706. For consistency with cases in which larx/stcx instruction pairs straddle a tsuspend instruction (e.g., tsuspend instruction 1708), reservation control logic 390 preferably clears reservation flag 392 in cases in which a larx/stcx instruction pair straddles a tresume instruction (e.g., tresume instruction 1710), in this case causing the conditional atomic update indicated by stcx instruction 1730 to fail.

The illustrative instruction sequence given in FIG. 17 finally includes a fourth larx/stcx instruction pair including larx instruction 1732 and stcx instruction 1734, which straddle the tend instruction 1704 terminating memory transaction 1700. In this case, reservation control logic 390 preferably resets reservation flag 392 in response to the tend request corresponding to execution of tend instruction 1704 in order to avoid leaving a reservation established within memory transaction 1700 active after memory transaction 1700 commits.

In each of these four cases, allowing a reservation to remain active through the state change implied by tbegin, tsuspend, tresume, tend instructions leads to undesirable behaviors.

Consequently, the architecture disclosed herein prevents or at least ameliorates these behaviors by resetting reservation flag 392 to cancel the active reservation.

Referring now to FIG. 18, there is shown an illustrative instruction sequence including a memory transaction 1800 and a larx/stcx instruction pair, including a larx instruction 1802 and stcx instruction 1804, that straddles the entire memory transaction 1800. In this case, reservation control logic 390 preferably resets reservation flag 392 as described above with reference to FIG. 17, and the conditional atomic memory update indicated by stcx instruction 1704 will fail. However, in an alternative embodiment, reservation control logic 390 can be configured to detect the scenario indicated in FIG. 18 in which the reservation spans an entire memory transaction and allow the conditional atomic memory update indicated by stcx instruction 1804 to succeed. In general, however, good programming practice limits the number and type of intervening instructions spanned by a larx/stcx instruction pair to increase the likelihood that the conditional atomic update indicated by the larx/stcx instruction pair may succeed. The present invention encourages this preferred programming practice by rendering ineffective any larx/stcx instruction pair spanning the beginning and/or end of a memory transaction.

Figures 19, 20, 21:
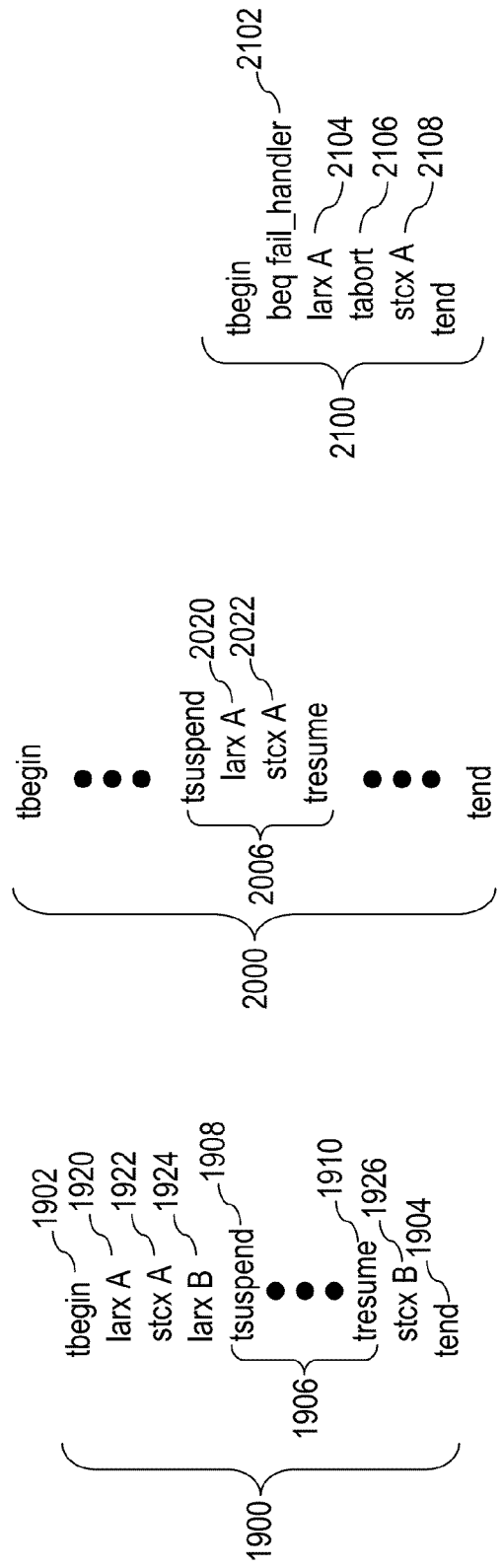
FIG. 19 is an illustrative example of several interactions between larx/stcx instruction pairs and a representative memory transaction in which the conditional memory update indicated by the stcx instruction will succeed.
FIG. 20 is an additional illustrative example of a larx/stcx instruction pair in a suspended region of a memory transaction.
FIG. 21 is an illustrative instruction sequence in which a larx/stcx instruction pair that is interrupted by a tabort or a conflict will fail to update memory.

With reference now to FIG. 19, there is shown a representative memory transaction 1900 including various larx/stcx instruction pairs that are architecturally permitted to succeed (but may nevertheless fail due to a conflicting storage update). Representative memory transaction 1900 may, for example, form a portion of a multiprocessor program.

As previously described, memory transaction 1900 of FIG. 19 begins with a tbegin instruction 1902, ends with a tend instruction 1904, and includes a suspended region 1906 initiated by a tsuspend instruction 1908 and terminated by a tresume instruction 1910. Within memory transaction 1900, a first larx/stcx instruction pair including larx instruction 1920 and stcx instruction 1922 is entirely enclosed within the transactional instruction region of memory transaction 1900. As such, barring conflicts due to updates by other processor cores 200, stcx instruction 1922 may succeed. However, even if stcx instruction 1922 succeeds, like any other transactional store within memory transaction 1900, the memory update is not finally committed to the distributed shared memory system and made visible to other threads unless and until memory transaction 1900 commits.

Memory transaction 1900 also includes a second larx/stcx instruction pair including larx instruction 1924 and stcx instruction 1926, which span suspended region 1906 bounded by tsuspend and tresume instructions 1908 and 1910. Unlike the case described above with reference to FIG. 18, in order to facilitate debugging (which may be the purpose of the suspend region), a larx/stcx instruction pair like that comprising instructions 1924 and 1926 is allowed to succeed, presuming no intervening conflicting memory update of another processor core 200 is detected. Additionally, allowing a reservation to survive over a suspend region allows the reservation to survive short interrupts such as short system calls or to allow the emulation of unimplemented instructions by lower level software (e.g., a virtual machine monitor or hypervisor) in a manner that is invisible to application programs. As further shown in FIG. 20, a larx/stcx instruction pair (e.g., instructions 2020 and 2022) contained entirely within a suspended region 2006 of a transaction 2000 may also succeed in the absence of an intervening conflicting memory update from another processor core 200.

With reference now to FIG. 21, there is shown an exemplary transaction 2100 containing a larx/stcx instruction pair (e.g., larx instruction 2104 and stcx instruction 2108) as well as a tabort instruction 2106. Larx instruction 2104 is executed first and accordingly causes a reservation to be established in reservation control logic 390. Tabort instruction 2106 then executes, causing memory transaction 2100 to fail, instruction execution to transition out of transactional mode, and control to transfer to branch instruction 2102. At the execution of tabort instruction 2106, memory transaction 2100 terminates and any reservation established during memory transaction 2100 is canceled, much in the same way that any reservation established in a memory transaction is canceled in response to execution of the outermost tend instruction (or a nested tend instruction in an alternative embodiment) as shown in FIG. 17. Also, if a conflict occurs (e.g., after the execution of larx instruction 2104 and before execution of tabort instruction 2106), control can also be transferred to branch instruction 2102, and if so, the reservation established by larx instruction 2104 is canceled. In summary, any transfer of control to the fail handler routine, in response to either execution of an explicit instruction (e.g., tabort instruction 2106) or occurrence of a conflict, causes the reservation to be canceled. Cancellation of the reservation in this manner prevents a reservation established in the memory transaction from erroneously remaining active during execution of the fail handler routine.

Figure 22:
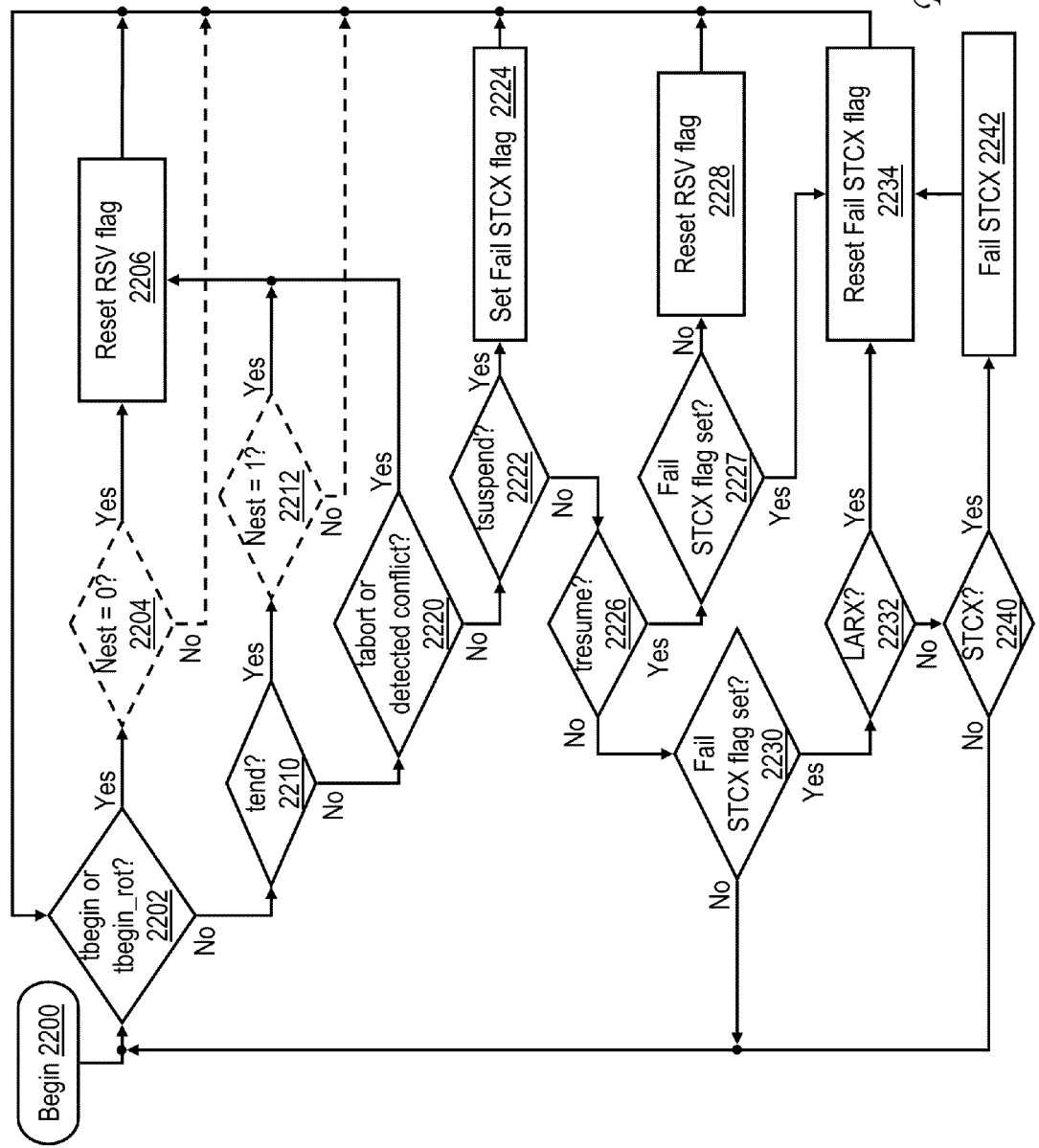
FIG. 22 is a high level logical flowchart of an exemplary method of processing larx/stcx instructions in the presence of memory transactions.

With reference now to FIG. 22 there is depicted a high level logical flowchart of an exemplary embodiment of a method of processing larx and stcx requests in the presence of memory transactions. Each pass through the flowchart represents processing by an L2 cache 230 of a particular request received by that L2 cache 230 in response to execution of an instruction by the associated processor core 200. The illustrated processing occurs in addition to the normal management of reservations and tracking for conflicting operations (not illustrated) also performed by reservation control logic 390.

The process begins at block 2200 in response to receipt by L2 cache 230 of a request from the associated processor core 200 in response to execution of an instruction by that processor core 200. The process then proceeds to block 2202, which illustrates TM logic 380 determining if the request received from processor core 200 is a memory transaction request corresponding to execution of a tbegin or tbegin_rot instruction by the associated processor core 200. If a memory transaction request corresponding to execution of a tbegin or tbegin_rot instruction is not detected at block 2202, the process passes to block 2210, which is described below. If however, TM logic 380 detects a memory transaction request corresponding to execution of a tbegin or tbegin_rot instruction that initiates a memory transaction, the process proceeds from block 2202 to optional block 2204, which depicts TM logic 380 determining whether or not the memory transaction initiated by the tbegin or tbegin_rot instruction is nested, for example, by determining whether nesting level register 1402 has a value of zero. If not, meaning that the present memory transaction is nested within another memory transaction, the process returns to block 2202, which has been described. If, however, block 2204 is omitted or a determination is made at block 2204 that the present memory transaction is not nested, the process proceeds to block 2206. Block 2206 depicts TM logic 380 resetting reservation flag 392 to cancel any pending reservation. In other words, if optional block 2204 is included, TM logic 380 resets reservation flag 392 only at the initiation of the outermost memory transaction, and if optional block 2204 is omitted, TM logic 380 resets reservation flag 392 at the initiation of each memory transaction, whether or not it is nested. Following block 2206, the process returns to block 2202, which has been described.

Referring now to block 2210, TM logic 380 determines whether or not the request received from the associated processor core 200 is a tend request corresponding to execution by the associated processor core 200 of a tend instruction terminating a memory transaction. If a tend request is not detected at block 2210, the process passes to block 2220, which is described below. In response to detection of a tend request at block 2210, the process proceeds to optional block 2212, which depicts TM logic 380 determining whether or not the memory transaction terminated by the tend instruction is nested, for example, by determining whether nesting level register 1402 has a value of one. If so, the process proceeds to block 2206, which depicts TM logic 380 resetting reservation flag 392 to cancel any pending reservation. If, however, TM logic 380 determines that the current memory transaction is nested (e.g., nesting level register has a value greater than one), control transfers to block 2202, which has been described. In other words, if optional block 2212 is included, TM logic 380 resets reservation flag 392 only at termination of the outermost memory transaction, and if optional block 2212 is omitted, TM logic 380 resets reservation flag 392 to cancel any pending reservation at the termination of all memory transactions, including nested memory transactions.

Referring now to block 2220, TM logic 380 determines whether the request received from the associated processor core 200 is a tabort request corresponding to execution of a tabort instruction by the associated processor core 200 and additionally monitors for occurrence of a conflict, as indicated, for example, by assertion of TM killed indication 385 (see, e.g., FIG. 3). If neither a tabort request or conflict is detected, the process passes to block 2222, which is described below. However, in response to detecting a tabort request corresponding to execution of a tabort instruction or in response to occurrence of a conflict, the memory transaction will fail, and control will be transferred to the fail handler routine. Accordingly, TM logic 380 resets reservation flag 392 to cancel any pending reservation, as depicted at block 2206.

Referring now to block 2222, TM logic 380 determines whether the request received from the associated processor core 200 is a tsuspend request corresponding to execution of a tsuspend instruction by the associated processor core 200. If not, the process proceeds to block 2226, which is described below. If, however, TM logic 380 detects a tsuspend request corresponding to execution of a tsuspend instruction, TM logic 380 sets a fail stcx flag 1404 (see, e.g., FIG. 14) within TM tracking logic 381 (block 2224). When set, fail stcx flag 1404 indicates that the memory transaction has entered a suspended region and that any stcx instruction that is encountered before a larx instruction should fail because the corresponding larx/stcx instruction pair (if present) straddle a tsuspend instruction. The process then returns from block 2224 to block 2202, which has been described.

Referring now to block 2226, TM logic 380 determines whether the request received from the associated processor core 200 is a tresume request corresponding to execution of a tresume instruction by the associated processor core 200. If not, the process proceeds to block 2230, which is described below. If, however, TM logic 380 detects a tresume request corresponding to execution of a tresume instruction ending a suspended region of a memory transaction, TM logic 380 determines at block 2227 whether or not not fail stcx flag 1404 is set. If so, the process passes to block 2234, which is described below. If, however, TM logic 380 determines at block 2227 that the fail stcx flag 1404 is not set, meaning that a reservation may have been established in the suspended region of the memory transaction, TM logic 380 resets reservation flag 392 to cancel any pending reservation prior to exiting the suspended region (block 2228). Thereafter, the process passes to block 2234, which illustrates TM logic 380 resetting fail stcx flag 1404, and thereafter returns to block 2202. It should be noted that resetting fail stcx flag 1404 at block 2234 allows a larx/stcx instruction pair (if present) that spans the entire suspended region to complete successfully in the absence of other conflicts.

Referring now to block 2230 and additionally to blocks 2232, 2240 and 2242, while stcx fail flag 1404 is set, meaning that instructions are being executed in a suspended region of a memory transaction, reservation control logic 390 monitors for larx and stcx requests corresponding respectively to execution of larx and stcx instructions by the associated processor core 200. In response to first detecting notification of execution of a larx instruction by the associated processor core 200 (which establishes a new reservation in the suspended region), reservation control logic 390 resets fail stcx flag 1404 at block 2234 to permit a stcx instruction within the suspended region (if present) to succeed in conditionally atomically updating memory. Following block 2234, the process returns to block 2202, which has been described. However, in response to reservation control logic 390 first detecting, while in a suspended region of a memory transaction, a stcx request corresponding to execution of a stcx instruction by the associated processor core 200, meaning that a larx/stcx instruction pair straddles the boundary of the suspended region, reservation control logic 390 fails the conditional atomic memory update indicated by the stcx instruction, as depicted at blocks 2240-2242. Following block 2242, the process passes to block 2234, which has been described.

To summarize, the process depicted in FIG. 22 cancels a reservation (causing the conditional atomic memory update indicated by a subsequent stcx to fail) or fails a stcx directly in response to detection of execution of an instruction delimiting a memory transaction (e.g., tbegin, tbegin_rot, or tend instruction) and in response to transfer of control to the fail handler routine of the memory transaction, and in response to execution of a stcx instruction within a suspended region without execution of a prior larx instruction within that suspended region.

With reference now to FIG. 23, there is illustrated a representative memory transaction 2300 including a tcheck (transaction check) instruction. Memory transaction 2300 may, for example, form a portion of a multiprocessor program.

The tcheck instruction, as described below, enables software to determine the current state of the memory transaction, including whether the memory transaction still has a chance to successfully commit and whether the values returned to load instructions prior to the tcheck instruction are consistent with the values, if any, written by the memory transaction. This state information can be particularly useful, inter alia, in debugging applications in which load instructions are used to obtain the values of certain memory locations that may have been modified by the memory transaction and the loaded values are written to a log region in memory non-speculatively in a suspended region of the memory transaction. For example, in memory transaction 2300, transactional store instruction 2302 modifies a memory location "A". Subsequently, a suspended region 2304 of memory transaction 2300 is entered at tsuspend instruction 2306 to write memory location values non-speculatively to a log. Load instruction 2308 loads the value of "A" to enable it to be written to a log by a subsequent non-transactional store instruction in suspended region 2304 (the store instruction to write the value of "A" to the log is omitted for clarity).

However, between store instruction 2302 and load instruction 2308, a conflict could occur, causing the value tentatively stored by store instruction 2302 to be discarded. When such a conflict occurs, the image of memory obtained by load instruction 2308 may be corrupted relative to the image of memory the executing thread was writing in memory transaction 2300. Software should be able to determine, at a minimum, whether or not the loaded values in suspended region 2304 may have been corrupted by a conflict. Tcheck instruction 2310 enables this determination by determining, at a minimum, if the non-transactional load instructions executed in suspended region 2304 may have read corrupted values and, if so, by setting a condition code register in processor core 200 to so indicate. In this use case, tcheck instruction 2310 thus allows software to determine whether or not a conflict has occurred and, if so, to take appropriate action because the log may be corrupted.

Various embodiments for a tcheck instruction are possible, and are optionally selectable, for example, utilizing differing instruction operation codes or mode controls. At one extreme, in a first embodiment, the tcheck instruction merely ensures that load instructions in the memory transaction prior to the tcheck instruction that are subject to corruption (e.g., load instructions in ROTs are not subject to corruption, unless the implementation tracks the transactional store footprint of the ROT and the load hits the ROT transactional store footprint) have bound their values before any conflicts have occurred. This check provides a minimum guarantee as to the consistency of the loaded memory values, but does not ensure that stored values were truly present in the transaction footprint when the load instructions read their values.

At the other extreme, the tcheck instruction can provide the same conflict detection and store propagation functions that a tend instruction provides (without committing the memory transaction). Such a tcheck instruction would be like a tend instruction and would indicate success or failure (thus far) of the memory transaction in a condition code register just like a tend instruction, but would not actually commit or fail the memory transaction. In other words, such a tcheck instruction would return the same pass/fail indication that a tend instruction executed at that point would have returned and the memory transaction is, instead, left active.

Yet another possible embodiment of the tcheck instruction ensures the values returned by the load instructions are consistent in the same manner as the first embodiment described above, and additionally ensures that the non-ROT store instructions (and ROT store instructions if the implementation tracks the transactional store footprint of the ROT) prior to the tcheck instruction propagate to the point that the updated values written by such store instructions are included within the transactional footprint of the memory transaction. In other words, such an implementation could not forward the transactional store values to subsequent load instructions and then allow the tcheck instruction to determine corruption of the values read by the load instructions before those stores values are entered into the store footprint of the memory transaction. This additional check moves closer to the full semantics of the embodiment that processes a tcheck instruction like a tend instruction (but without committing the memory transaction).

Those skilled in the art will recognize that there are yet more possible embodiments for the semantics of a tcheck instruction including waiting until more or fewer of the load or store instructions within the memory transaction or the suspended regions within a memory transaction have completed. For example, processing of a tcheck instruction could only wait for the suspend mode load instructions to have their values bound, rather than waiting for both the prior non-ROT transactional load instructions and suspend mode load instructions to have their values bound. Such an implementation of the tcheck instruction ensures only that suspend mode load instructions receive a consistent value unaffected by a conflict, but does not ensure that all prior transactional load instructions are registered with the transaction footprint and subject to pending conflicts.

Referring now to FIG. 24, there is depicted a high level logical flowchart depicting two alternative methods of processing a tcheck instruction, one merely ensuring the prior suspend mode load and non-ROT transactional load instructions (or additionally ROT load instructions that hit a transactional store footprint in implementations that track ROT stores) have bound their values and the other additionally ensuring that the non-ROT transactional store instructions have been registered within the transaction footprint. The process begins at block 2400, for example, in response to initiation of execution of a tcheck instruction within LSU 202 of a processor core 200. The process proceeds to block 2402, which depicts processor core 200 ensuring that all suspend mode load and non-ROT transactional load instructions within the current memory transaction have bound their values. This check ensures that any suspend mode load instructions have obtained their values and that any non-ROT load instructions have been included within the transaction footprint. The process then proceeds to optional block 2404, which illustrates processor core 200 ensuring that any non-ROT transactional store instructions are registered in the transaction footprint and are therefore subject to any conflicts that may occur. Following block 2404 (if present) or block 2402 (if block 2404 is omitted), LSU 202 passes a tcheck request to the associated L2 cache 230.

In response to the tcheck request, TM logic 380 determines whether or not a conflict has occurred for the memory transaction (block 2408). As indicated at blocks 2410 and 2412, TM logic 380 indicates to processor core 200 whether or not a conflict has occurred for the current memory transaction via pass/fail indication 384. After either of blocks 2410 or 2412, the process for processing a tcheck instruction given in FIG. 24 terminates at block 2414.

Figure 25:
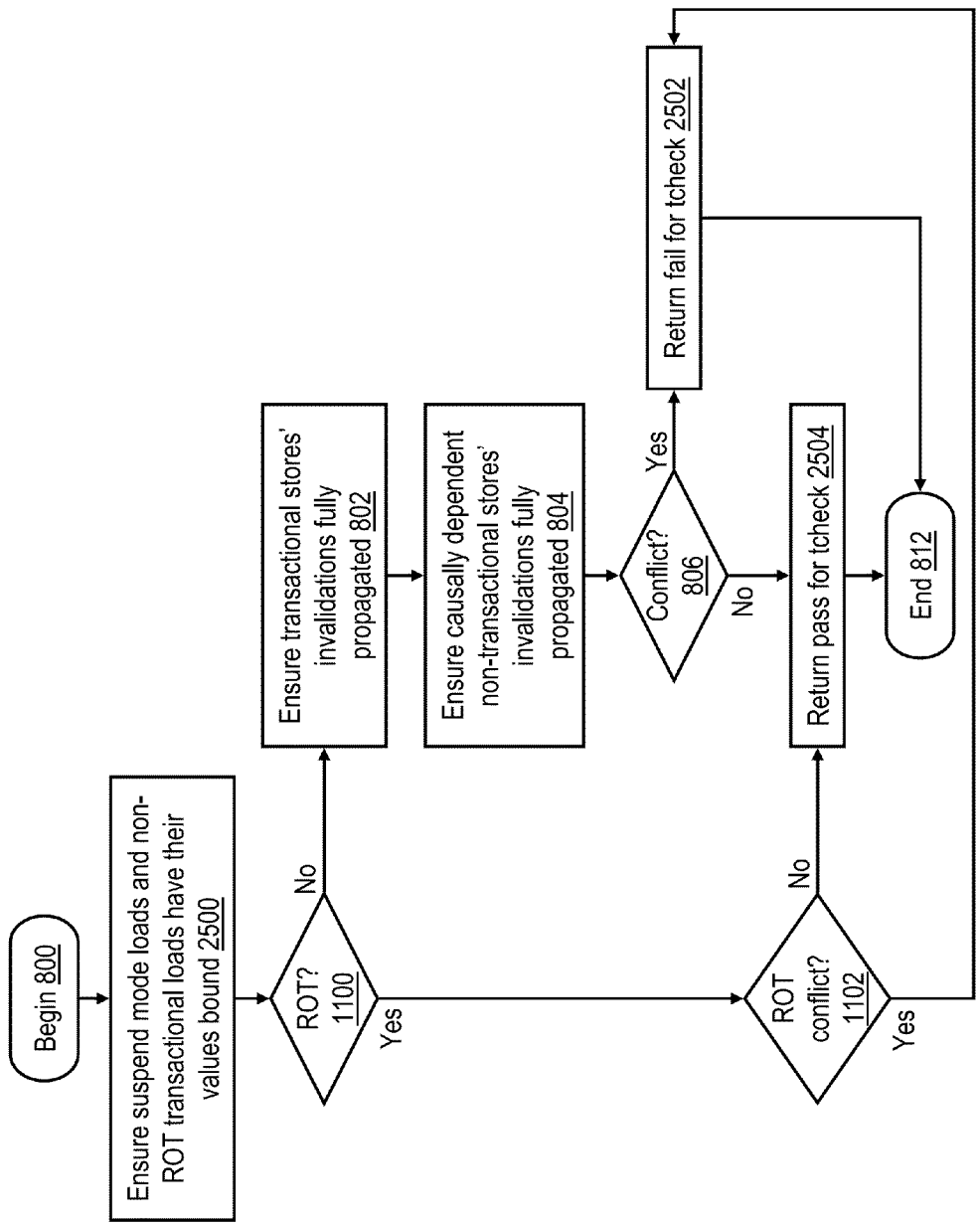
FIG. 25 is a high level logical flowchart depicting another embodiment of an exemplary method of processing a tcheck instruction.

With reference now to FIG. 25, there is illustrated a high level logical flowchart of a method of processing a tcheck instruction utilizing semantics similar to those of a tend instruction (but without committing the memory transaction). For ease of understanding, like reference numerals are utilized to denote steps corresponding to those depicted in FIG. 11.

The process of FIG. 25 begins at block 2500, for example, in response to initiation of execution of a tcheck instruction within the LSU 202 of a processor core 200. LSU 202 then ensures at block 2500 that all prior suspend mode load instructions and all prior non-ROT transactional load instructions have their values bound. This check ensures the non-ROT transactional load instructions are present in the memory transaction's footprint and that the suspend mode load instructions have obtained their values. LSU 202 then determines at block 1100 whether or not the memory transaction is currently in a ROT or non-ROT mode. In response to a determination that the memory transaction is in a non-ROT mode, the process continues to blocks 802-804, described above.

Following block 804, LSU 202 transmits a tcheck request to its associated L2 cache 230 to query TM logic 380 whether a conflict has been detected for the load or store footprint of the memory transaction (block 806). In response to the tcheck request, TM logic 380 determines whether a conflict for the load and store footprints of the memory transaction was detected by TM tracking logic 381 and indicates via pass/fail indication 384 that the memory transaction has failed (block 2502) or that the memory transaction has passed (block 2504), as appropriate. The process then terminates at step 812.

Returning to block 1100, in response to a determination that the memory transaction is a ROT, blocks 802, 804, and 806 are bypassed as unnecessary for a ROT, and control passes to block 1102. Block 1102 depicts LSU 202 querying TM logic 380 via a tcheck request whether a conflict for the ROT's store footprint was detected by TM tracking logic 381 (as opposed to a conflict on either the load or store footprint for a non-ROT memory transaction). In response to TM logic 380 determining that a conflict has been detected for the store footprint of the ROT, the process then proceeds to either block 2502 or block 2504, which have been described.

Figure 26:
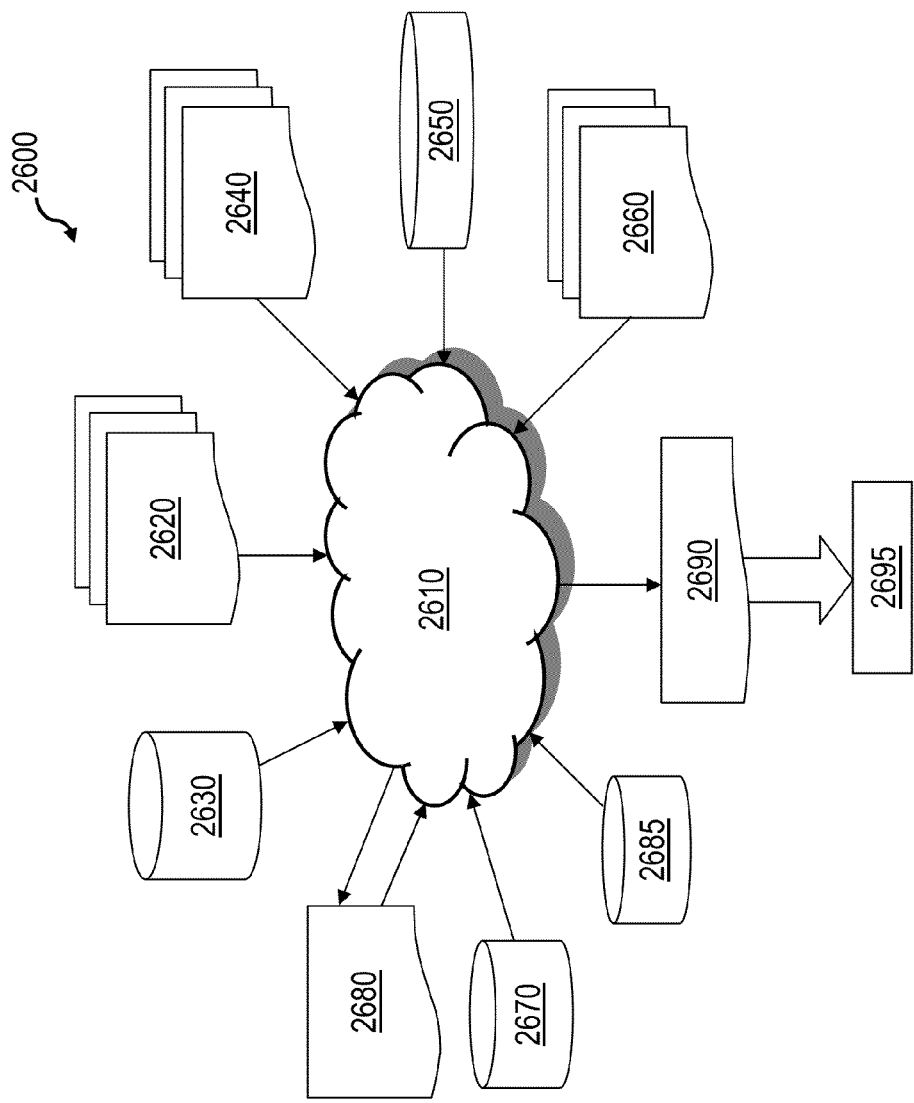
FIG. 26 is a data flow diagram illustrating a design process.

With reference now to FIG. 26, there is depicted a block diagram of an exemplary design flow 2600 used for example, in semiconductor IC logic design, simulation, test, layout, and manufacture. Design flow 2600 includes processes, machines and/or mechanisms for processing design structures or devices to generate logically or otherwise functionally equivalent representations of the design structures and/or devices described above and shown in FIGS. 1-3, 7, 10 and 14. The design structures processed and/or generated by design flow 2600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 2600 may vary depending on the type of representation being designed. For example, a design flow 2600 for building an application specific IC (ASIC) may differ from a design flow 2600 for designing a standard component or from a design flow 2600 for instantiating the design into a programmable array, for example a programmable gate array (PGA) or a field programmable gate array (FPGA) offered by Altera® Inc. or Xilinx® Inc.

FIG. 26 illustrates multiple such design structures including an input design structure 1020 that is preferably processed by a design process 2610. Design structure 2620 may be a logical simulation design structure generated and processed by design process 2610 to produce a logically equivalent functional representation of a hardware device. Design structure 2620 may also or alternatively comprise data and/or program instructions that when processed by design process 2610, generate a functional representation of the physical structure of a hardware device. Whether representing functional and/or structural design features, design structure 2620 may be generated using electronic computer-aided design (ECAD) such as implemented by a core developer/designer. When encoded on a machine-readable data transmission, gate array, or storage medium, design structure 2620 may be accessed and processed by one or more hardware and/or software modules within design process 2610 to simulate or otherwise functionally represent an electronic component, circuit, electronic or logic module, apparatus, device, or system such as those shown in FIGS. 1-3, 7, 10 and 14. As such, design structure 2620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 2610 preferably employs and incorporates hardware and/or software modules for synthesizing, translating, or otherwise processing a design/simulation functional equivalent of the components, circuits, devices, or logic structures shown in FIGS. 1-3, 7, 10 and 14 to generate a netlist 2680 which may contain design structures such as design structure 2620. Netlist 2680 may comprise, for example, compiled or otherwise processed data structures representing a list of wires, discrete components, logic gates, control circuits, I/O devices, models, etc. that describes the connections to other elements and circuits in an integrated circuit design. Netlist 2680 may be synthesized using an iterative process in which netlist 2680 is resynthesized one or more times depending on design specifications and parameters for the device. As with other design structure types described herein, netlist 2680 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 2610 may include hardware and software modules for processing a variety of input data structure types including netlist 2680. Such data structure types may reside, for example, within library elements 2630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 2640, characterization data 2650, verification data 2660, design rules 2670, and test data files 2685 which may include input test patterns, output test results, and other testing information. Design process 2610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 2610 without deviating from the scope and spirit of the invention. Design process 2610 may also include modules for performing standard circuit design processes such as timing analysis, verification, design rule checking, place and route operations, etc.

Design process 2610 employs and incorporates logic and physical design tools such as HDL compilers and simulation model build tools to process design structure 2620 together with some or all of the depicted supporting data structures along with any additional mechanical design or data (if applicable), to generate a second design structure 2690. Design structure 2690 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 2620, design structure 2690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3, 7, 10 and 14. In one embodiment, design structure 2690 may comprise a compiled, executable HDL simulation model that functionally simulates the devices shown in FIGS. 1-3, 7, 10 and 14.

Design structure 2690 may also employ a data format used for the exchange of layout data of integrated circuits and/or symbolic data format (e.g., information stored in a GDSII (GDS2), GL1, OASIS, map files, or any other suitable format for storing such design data structures). Design structure 2690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3, 7, 10 and 14. Design structure 2690 may then proceed to a stage 2695 where, for example, design structure 2690: proceeds to tape-out, is released to manufacturing, is released to a mask house, is sent to another design house, is sent back to the customer, etc.

As has been described, in at least one embodiment, a multiprocessor data processing system has a distributed shared memory system. A memory transaction that is a rewind-only transaction (ROT) and that includes one or more transactional memory access instructions and a transactional abort instruction is executed. In response to execution of the one or more transactional memory access instructions, one or more memory accesses to the distributed shared memory system indicated by the one or more transactional memory access instructions are performed. In response to execution of the transactional abort instruction, execution results of the one or more transactional memory access instructions are discarded and control is passed to a fail handler.

In at least one embodiment, first and second nested memory transactions are executed in a multiprocessor data processing system having a distributed shared memory system, where the first memory transaction is a rewind-only transaction (ROT) and the second memory transaction is a non-ROT memory transaction. The first memory transaction has a transaction body including the second memory transaction and an additional plurality of transactional memory access instructions. In response to execution of the transactional memory access instructions, memory accesses are performed to the distributed shared memory system. Conflicts between memory accesses not within the first memory transaction and at least a load footprint of any of the transactional memory access instructions preceding the second memory transaction are not tracked. However, conflicts between memory accesses not within the first memory transaction and store and load footprints of any of the transactional memory access instructions that follow initiation the second memory transaction are tracked.

In at least one embodiment, an instruction sequence including, in order, a load-and-reserve instruction specifying a read access to a target memory block, an instruction delimiting transactional memory access instructions belonging to a memory transaction, and a store-conditional instruction specifying a conditional write access to the target memory block is detected by a processor. In response to detecting the instruction sequence, the processor causes the conditional write access to the target memory block to fail.

In at least one embodiment, a processing unit of a data processing system having a shared memory system executes a memory transaction including a transactional store instruction that causes a processing unit of the data processing system to make a conditional update to a target memory block of the shared memory system conditioned on successful commitment of the memory transaction. The memory transaction further includes a transaction check instruction. In response to executing the transaction check instruction, the processing unit determines, prior to conclusion of the memory transaction, whether the target memory block of the shared memory system was modified after the conditional update caused by execution of the transactional store instruction. In response to determining that the target memory block has been modified, a condition register within the processing unit is set to indicate a conflict for the memory transaction.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage medium storing program code that can be processed by a data processing system. The computer-readable storage medium can include volatile or non-volatile memory, an optical or magnetic disk, or the like, but excludes signal media.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system having a shared memory system, the method comprising:
   in a processing unit of the data processing system, executing a memory transaction, wherein executing the memory transaction includes:
   executing a plurality of transactional store instructions within the memory transaction that causes the processing unit of the data processing system to make a corresponding plurality of conditional updates to target memory blocks of the shared memory system conditioned on successful commitment of the memory transaction;
   following execution of the transactional store instruction, executing a transaction check instruction within the memory transaction that causes integrated circuitry within the processing unit to perform:

refraining from committing the plurality of conditional updates caused by execution of the plurality of transactional store instructions to the shared memory system;

determining, prior to conclusion of the memory transaction, whether all of the target memory blocks of the shared memory system were unmodified after conditionally updated by execution of the plurality of transactional store instructions;

and in response to determining that at least one of the plurality of target memory blocks was modified after conditionally updated by execution of the plurality of transactional store instructions, setting the condition register to indicate a conflict for the memory transaction;

executing a transactional load instruction that causes the processing unit to conditionally load a value from the shared memory system conditioned on successful commitment of the memory transaction; executing the transaction check instruction further causes the processing unit to perform: ensuring, prior to the determining, that the value has been bound to the transactional load instruction; and following execution of the transaction check instruction, executing one or more additional instructions of the memory transaction.

2. The method of claim 1, wherein:

executing the transaction check instruction further causes the processing unit to perform:

determining whether the value loaded in response to execution of the transactional load instruction was modified after execution of the transactional load instruction; and in response to determining that the value was modified, setting the condition register within the processing unit to indicate a conflict for the memory transaction.

3. The method of claim 2, wherein:

executing the transaction check instruction further causes the processing unit to perform:

determining whether or not the memory transaction is a rewind-only memory transaction;

the processing unit determines whether the value loaded in response to execution of the transactional load instruction was modified after execution of the transactional load instruction in response to determining the memory transaction is not a rewind-only transaction; and the processing unit refrains from determining, in response to execution of the transaction check instruction, whether the value was modified after execution of the transactional load instruction in response to determining the memory transaction is a rewind-only memory transaction.

4. The method of claim 1, wherein:

the method further comprises in response to execution of the plurality of transactional store instructions, identifying the target memory block for conflict tracking in transactional memory logic of the processing unit; and executing the transaction check instruction further causes the processing unit to perform:

ensuring, prior to the determining, that the target memory block is identified for conflict tracking in the transactional memory logic of the processing unit.

5. The method of claim 1, wherein executing the transaction check instruction includes executing the transaction check instruction within a suspended region of the memory transaction in which one or more memory accesses are non-speculatively performed with respect to the shared memory system.

6. The method of claim 5, wherein:

executing the memory transaction includes executing a transactional load instruction that causes the processing unit to conditionally load a value from the shared memory system conditioned on successful commitment of the memory transaction; and the method further comprises executing, within the suspended region, a non-transactional store instruction that causes the processing unit to unconditionally store the value loaded from the shared memory system to a log within the shared memory system.

* * * * *